US011318962B2

(12) United States Patent
Safour et al.

(10) Patent No.: US 11,318,962 B2
(45) Date of Patent: May 3, 2022

(54) SYSTEMS AND METHODS FOR VEHICLE STEERING CONTROL

(71) Applicant: STEERING SOLUTIONS IP HOLDING CORPORATION, Saginaw, MI (US)

(72) Inventors: Salaheddine Safour, Essonne (FR); Rani Faddoul, Val de Marne (FR); Pierre C. Longuemare, Paris (FR); Joachim J. Klesing, Rochester, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 132 days.

(21) Appl. No.: 16/816,667

(22) Filed: Mar. 12, 2020

(65) Prior Publication Data

US 2020/0290646 A1 Sep. 17, 2020

Related U.S. Application Data

(60) Provisional application No. 62/817,148, filed on Mar. 12, 2019, provisional application No. 62/817,320, (Continued)

(51) Int. Cl.
*B60W 60/00* (2020.01)
*B62D 1/04* (2006.01)
(Continued)

(52) U.S. Cl.
CPC ........ *B60W 60/0051* (2020.02); *B60W 50/16* (2013.01); *B62D 1/04* (2013.01);
(Continued)

(58) Field of Classification Search
CPC ............. B60W 60/0051; B60W 50/16; B60W 2050/146; B60W 50/14; B60W 2540/18;
(Continued)

(56) References Cited

U.S. PATENT DOCUMENTS 9,342,074 B2 * 5/2016 Dolgov ................ G05D 1/0061
9,684,306 B2 * 6/2017 Sprigg ..................... B60Q 9/00
(Continued)

FOREIGN PATENT DOCUMENTS

EP 2930081 A1 10/2015

*Primary Examiner* — Dale W Hilgendorf
*Assistant Examiner* — Alexander C. Bost
(74) *Attorney, Agent, or Firm* — Dickinson Wright PLLC

(57) ABSTRACT

A method for providing operating mode transition for a vehicle includes receiving an input indicating a request to transition from a first operating mode of the vehicle to a second operating mode of the vehicle and determining a first planned trajectory corresponding to the first operating mode. The method also includes determining a second planned trajectory corresponding to the second operating mode. The method also includes determining a first road wheel actuator angle corresponding to the first planned trajectory and determining a second road wheel actuator angle corresponding to the second planned trajectory. The method also includes determining a difference between a current handwheel actuator angle and a handwheel actuator angle corresponding to the second road wheel actuator angle and, in response to a determination that the difference is less than a threshold, transitioning from the first operating mode to the second operating mode over a determined period.

18 Claims, 20 Drawing Sheets

Related U.S. Application Data filed on Mar. 12, 2019, provisional application No. 62/817,312, filed on Mar. 12, 2019.

(51) Int. Cl.
    *B60W 50/16*    (2020.01)
    *B62D 6/00*    (2006.01)
    *B62D 5/04*    (2006.01)

(52) U.S. Cl.
    CPC ......... *B62D 5/0409* (2013.01); *B62D 5/0463* (2013.01); *B62D 6/002* (2013.01)

(58) Field of Classification Search
    CPC ....... B60W 2710/202; B60W 2520/10; B60W 2520/01; B60W 2710/207; B60W 60/0057; B60W 60/0055; B60W 10/20; B62D 15/025; B62D 6/007; B62D 1/286; B62D 1/04; B62D 6/002; B62D 5/0463; B62D 5/0409

See application file for complete search history.

(56) References Cited

U.S. PATENT DOCUMENTS

| | | | |
|---|---|---|---|
| 9,904,286 B2* | 2/2018 | Kozak | G05D 1/0061 |
| 2007/0288140 A1* | 12/2007 | Wheals | B60W 30/188 |
| | | | 701/36 |
| 2014/0303827 A1* | 10/2014 | Dolgov | B60W 30/00 |
| | | | 701/23 |
| 2018/0362043 A1* | 12/2018 | Hwang | B60W 50/14 |
| 2019/0047617 A1* | 2/2019 | Oblizajek | B62D 5/006 |
| 2019/0300014 A1* | 10/2019 | Nagase | B62D 1/046 |
| 2020/0269837 A1* | 8/2020 | Nath | B60W 60/0053 |
| 2020/0285233 A1* | 9/2020 | Hafner | B60Q 9/00 |
| 2021/0009194 A1* | 1/2021 | Kim | B62D 6/00 |
| 2021/0245791 A1* | 8/2021 | Krone | B62D 1/04 |

\* cited by examiner

| | No Automation (Level 0) | Driver Assistance (Level 1) | Partial Automation (Level 2) | Conditional Automation (Level 3) | High Automation (Level 4) | Full Automation (Level 5) |
|---|---|---|---|---|---|---|
| SAE | | | | | | |
| BASt | Driver Only | Assisted | Partly Automated | Highly Automated | Fully Automated | (not addressed) |
| NHTSA | No Automation (Level 0) | Function Specific Automation (Level 1) | Combined Function Automation (Level 2) | Limited Self-Driving Automation (Level 3) | Full Self-Driving Automation (Level 4) | |

FIG. 2

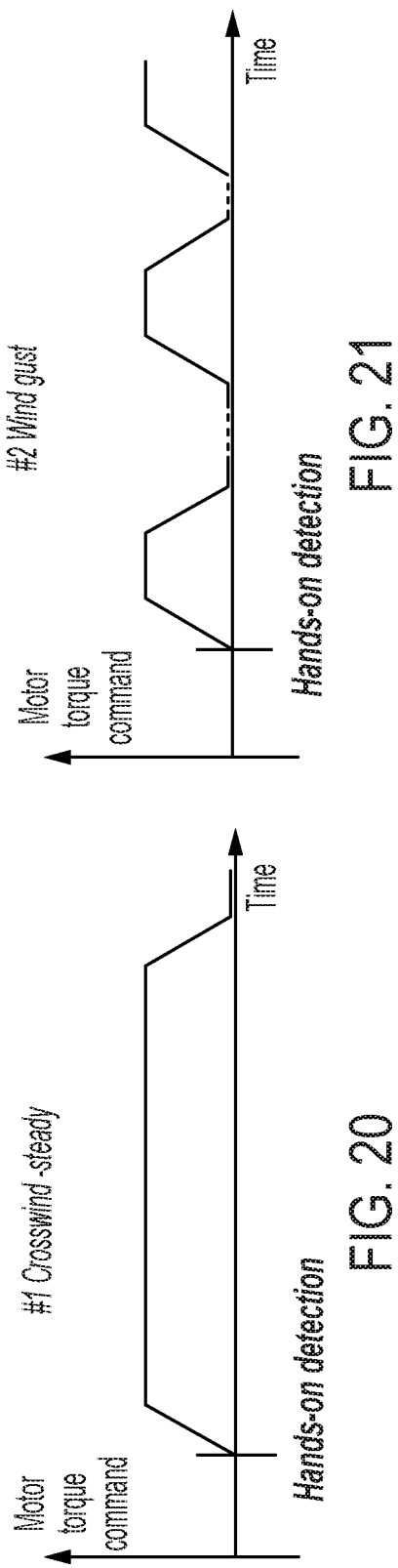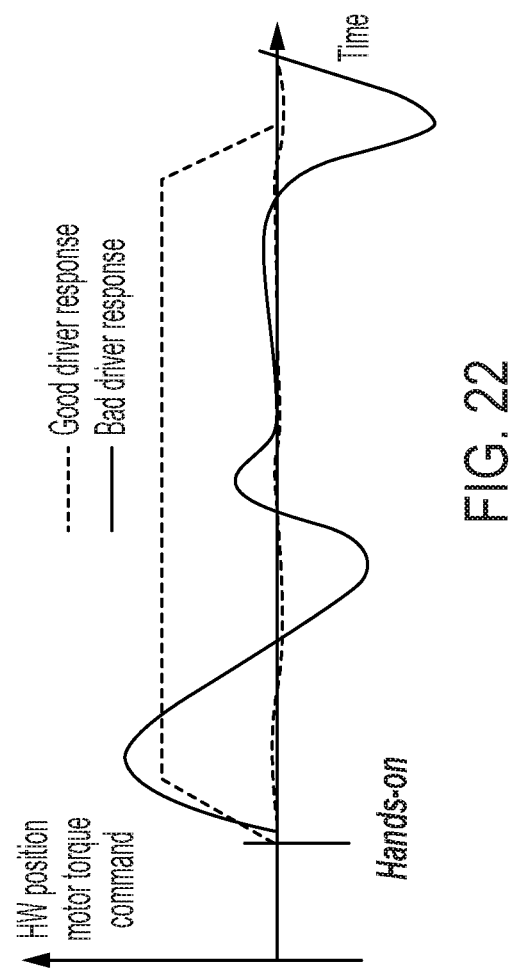

SYSTEMS AND METHODS FOR VEHICLE STEERING CONTROL

CROSS-REFERENCES TO RELATED APPLICATIONS

This patent application claims priority to U.S. Provisional Patent Application Ser. No. 62/817,148, filed Mar. 12, 2019, U.S. Provisional Patent Application Ser. No. 62/817,312, filed Mar. 12, 2019, and U.S. Provisional Patent Application Ser. No. 62/817,320, filed Mar. 12, 2019, each of which is incorporated herein by reference in its entirety.

BACKGROUND

An electric power steering (EPS) typically includes components such as steering wheel, column, rack-pinion gear, electric motor actuator etc. The EPS helps the operator to steer a vehicle by providing necessary torque assist. The assist torque is based on operator's applied torque. In a steady-state sense, the operator torque and assist torque counter the rack force generated because of tire-road interaction.

A typical Steer by wire (SbW) system includes a road-wheel actuator (RWA) unit and handwheel (or steering wheel) actuator (HWA) unit. Unlike the EPS, the two units in the SbW are mechanically disconnected and communicate through controlled area network (CAN) interface (or other similar digital communication protocols). The HWA unit receives a rack force signal from the RWA unit to generate an appropriate torque feel for the operator. Alternatively, the handwheel angle and vehicle speed can also be used to generate desired torque feel to the operator. The angle from HWA unit is sent to the RWA unit, which performs position control-to-control rack travel.

SUMMARY

This disclosure relates generally to steer by wire vehicle systems.

One or more embodiments are described for managing a transition of steering control between a fully autonomous control mode and a manual control mode. The managing includes guiding/limiting the driver from changing the handwheel angle based on a vehicle trajectory being provided by an autonomous driver assistance system. The guiding can include generating haptic feedback and other types of notifications for the driver. The managing can further include synchronizing the handwheel angle and the road wheel angle as the vehicle trajectory transitions from a first trajectory from the ADAS to a second trajectory from the driver.

An aspect of the disclosed embodiments includes a system for providing operating mode transition for a vehicle. The system includes a processor and a memory. The method includes instructions that, when executed by the processor, cause the processor to: receive an input indicating a request to transition from a first operating mode of the vehicle to a second operating mode of the vehicle; determine a first planned trajectory corresponding to the first operating mode; determine a second planned trajectory corresponding to the second operating mode; determine a first road wheel actuator angle corresponding to the first planned trajectory; determine a second road wheel actuator angle corresponding to the second planned trajectory; determine a difference between a current handwheel actuator angle and a handwheel actuator angle corresponding to the second road wheel actuator angle; and, in response to a determination that the difference is less than a threshold, transition from the first operating mode to the second operating mode over a determined period.

Another aspect of the disclosed embodiments includes a method for providing operating mode transition for a vehicle. The method includes receiving an input indicating a request to transition from a first operating mode of the vehicle to a second operating mode of the vehicle. The method also includes determining a first planned trajectory corresponding to the first operating mode. The method also includes determining a second planned trajectory corresponding to the second operating mode. The method also includes determining a first road wheel actuator angle corresponding to the first planned trajectory. The method also includes determining a second road wheel actuator angle corresponding to the second planned trajectory. The method also includes determining a difference between a current handwheel actuator angle and a handwheel actuator angle corresponding to the second road wheel actuator angle. The method also includes, in response to a determination that the difference is less than a threshold, transitioning from the first operating mode to the second operating mode over a determined period.

Another aspect of the disclosed embodiments includes a method of transitioning an operating mode for a vehicle. The method includes receiving a takeover request from an operator. The method also includes providing haptic feedback to the operator. The method also includes performing a driver readiness assessment. The method also includes transitioning from a first operating mode to a second operating mode using a shared control transition mode.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

FIG. 2 generally illustrates a comparison between the automation levels in one or more standards according to the principles of the present disclosure.

FIGS. 18-23 generally illustrate another embodiment of a driver readiness evaluation system according to the principles of the present disclosure

DETAILED DESCRIPTION

Figure 1:
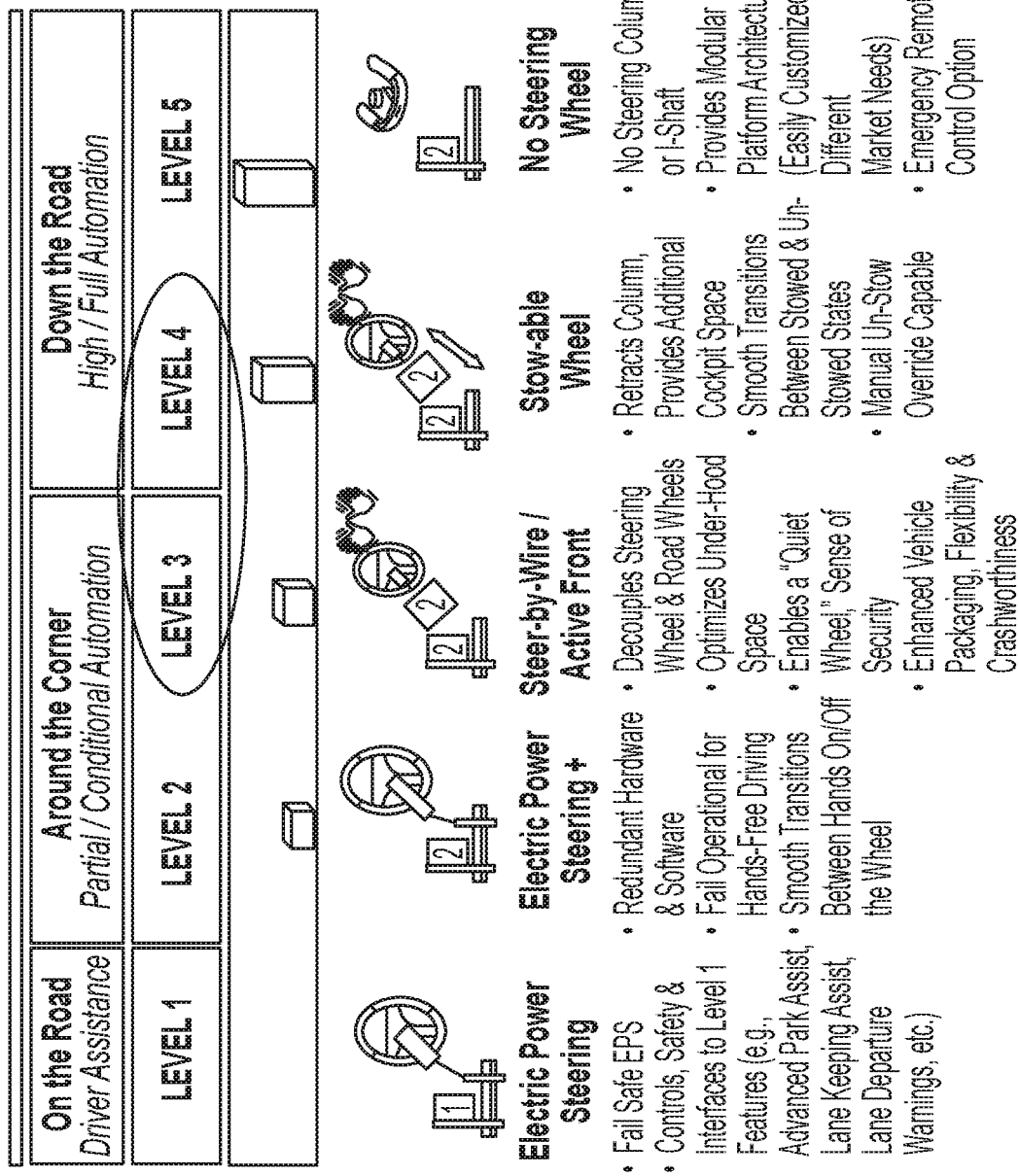
FIG. 1 generally illustrates example levels according to the principles of the present disclosure.

The following discussion is directed to various embodiments of the disclosure. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

As used herein the terms module and sub-module refer to one or more processing circuits such as an application specific integrated circuit (ASIC), an electronic circuit, a processor (shared, dedicated, or group) and memory that executes one or more software or firmware programs, a combinational logic circuit, and/or other suitable components that provide the described functionality. As can be appreciated, the sub-modules described below can be combined and/or further partitioned.

The present application is generally related to steering systems, and particularly describes one or more techniques for providing operator notification using handwheel actuators in steer by wire type steering systems.

The steering system helps the operator to steer a vehicle by providing necessary torque assist. Today, a modern steering system typically includes components such as steering wheel, column, rack-pinion gear, electric motor actuator etc. The assist torque is based on operator's applied torque. In a steady-state sense, the operator torque and assist torque counter the rack force generated because of tire-road interaction.

The embodiments described herein are applicable to autonomous or semi-autonomous vehicles. Autonomous or semi-autonomous vehicles include at least one aspect of driving functionality that is performed automatically with no, or minimal, driver input. Steering, braking and accelerating are examples of driving capabilities that may be carried out autonomously or semi-autonomously when the vehicle is in an autonomous driving mode.

When such aspects of driving are commanded by the driver, the vehicle is said to be in a manual driving mode. The autonomous driving mode typically engages one or more systems in operative communication with vehicle components, such as components associated with steering, braking, and accelerating. One such system is referred to as an ADAS, as noted above. The ADAS includes various components, such as a controller and processor in operative communication with the vehicle components or devices.

In some embodiments, the systems and methods described herein may be configured to receive an input indicating a request to transition from a first operating mode of the vehicle to a second operating mode of the vehicle. The systems and methods described herein may be configured to determine a first planned trajectory corresponding to the first operating mode. The systems and methods described herein may be configured to determine a second planned trajectory corresponding to the second operating mode. The systems and methods described herein may be configured to determine a first road wheel actuator angle corresponding to the first planned trajectory. The systems and methods described herein may be configured to determine a second road wheel actuator angle corresponding to the second planned trajectory. The systems and methods described herein may be configured to determine a difference between a current handwheel actuator angle and a handwheel actuator angle corresponding to the second road wheel actuator angle. The systems and methods described herein may be configured to, in response to a determination that the difference is less than a threshold, transition from the first operating mode to the second operating mode over a determined period.

In some embodiments, the systems and methods described herein may be configured to receive a takeover request from an operator. The systems and methods described herein may be configured to provide haptic feedback to the operator. The systems and methods described herein may be configured to perform a driver readiness assessment. The systems and methods described herein may be configured to transition from a first operating mode to a second operating mode using a shared control transition mode.

The Society of Automotive Engineers (SAE) in SAE Standard J3016 has defined six levels of driving automation: 0 (no automation), 1 (driver assistance), 2 (partial automation), 3 (conditional automation), 4 (high automation), and 5 (full automation. FIG. 1 generally illustrates example levels determined in the SAE J3016 standards. SAE Level 3 autonomy requires that execution of and monitoring of the driving environment be handled by a system while the fallback performance of dynamic driving tasks be the responsibility of a human driver. As ADAS transform the auto-industry, EPS systems are adapting to accommodate that market segment. For example, EPS systems configured to support use cases that are SAE Level 3 compatible in the short-term, which eventually operate in Level 4, the levels being those determined by the SAE J3016 standards related to on-road motor vehicle automated driving systems, may be desirable.

Accordingly, it is desirable to develop EPS systems that are compatible with the proposed standards. For example, it is desirable that the EPS system determine a mode of operation between a highly automated operating mode and a fully automated operating mode. Further, it is desirable that the EPS system hardware be controllable to handle inertial effects of steering wheel that is no longer in use in the fully automated operating mode. Further yet, it is desirable that EPS systems monitor and record diagnostics appropriately, for example, torque sensor faults, which are unique per mode of operation.

It should be noted that although the embodiments disclosed herein refer to the SAE J3016 standards and terms, the technical solutions herein are applicable to vehicles that use other standards such as Federal Highway Research Institute (BASt) and National Highway Traffic Safety Administration (NHTSA) standards that address similar cases as the SAE standards possibly using different terms. For example, FIG. 2 generally illustrates a comparison between the levels in such standards.

Based on SAE standard, with level 3 and level 4 offering the steering control of the vehicle has to transition from robot (e.g., autonomous controller or system) to driver. This transition phase can be a technical challenge, particularly for a vehicle is equipped with a steer-by-wire system operating in quiet wheel mode (steering wheel does not rotate to follow the actual road wheels angle) during the autonomous driving.

In case of the ADAS vehicles, as the level of automation increases, a human driver or operator of the vehicle 10 becomes less involved with vehicle (steering) control, and the added human sense of failure detection is displaced. The technical solutions herein facilitate determining which modes of operation the vehicle 10 is operating in, such as driver-based and highly autonomous, and accordingly facilitates transitioning the EPS system from one mode to another. Further, in driver-involved modes of operation, the EPS system provides various feedback to the driver to facilitate the driver to take actions in response to the driving conditions. Such feedback may not be provided, replaced with other types of feedback, in highly-autonomous mode. Further, monitoring diagnostic conditions varies between the operating modes, which the technical solutions herein facilitate the EPS system to perform.

Figure 3:
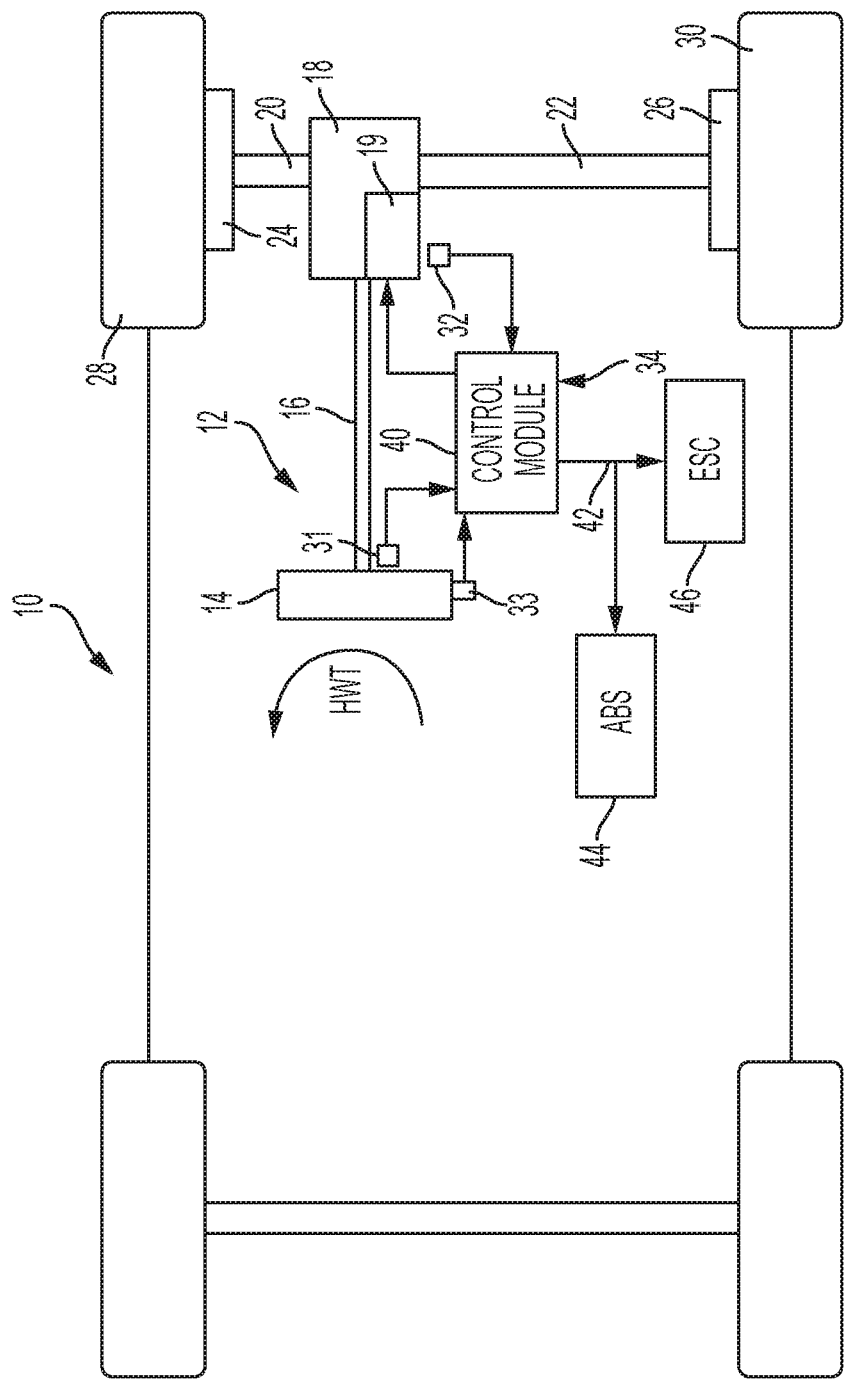
FIG. 3 generally illustrates a vehicle including a steering system according to the principles of the present disclosure.

FIG. 3 is an exemplary embodiment of a vehicle 10 including a steering system 12. In various embodiments, the steering system 12 includes a handwheel 14 coupled to a steering shaft system 16 which includes steering column, intermediate shaft, & the necessary joints. In one exemplary embodiment, the steering system 12 is an EPS system that further includes a steering assist unit 18 that couples to the steering shaft system 16 of the steering system 12, and to tie rods 20, 22 of the vehicle 10.

Additionally, or alternatively, steering assist unit 18 may be couple the upper portion of the steering shaft system 16 with or to the lower portion of the steering shaft system 16. The steering assist unit 18 may include a rack and pinion steering mechanism (not shown) that may be coupled through the steering shaft system 16 to a steering actuator motor 19 and/or various gearing mechanisms. During operation, as a vehicle operator turns the handwheel 14, the steering actuator motor 19 provides the assistance to move the tie rods 20, 22 that in turn moves steering knuckles 24, 26, respectively, coupled to roadway wheels 28, 30, respectively of the vehicle 10.

As generally illustrated in FIG. 3, the vehicle 10 may further include various sensors 31, 32, 33 that detect and measure observable conditions of the steering system 12 and/or of the vehicle 10. The sensors 31, 32, 33 generate sensor signals based on the observable conditions. In some embodiments, the sensor 31 includes a torque sensor that senses an input driver handwheel torque (HWT) applied to the handwheel 14 by the operator of the vehicle 10. The torque sensor generates a driver torque signal based thereon. In some embodiments, the sensor 32 includes a motor angle and speed sensor that senses a rotational angle as well as a rotational speed of the steering actuator motor 19. In some embodiments, the sensor 33 includes a handwheel position sensor that senses a position of the handwheel 14. The sensor 33 generates a handwheel position signal based thereon.

A control module 40 may include a processor and a memory including instructions that, when executed by the processor, cause the processor to perform the functions described herein. The memory may include any suitable memory including solid-state memory, non-volatile memory, volatile memory, random access memory, read only memory, other suitable memory, or a combination thereof. The processor may include any suitable processor, such as those described herein.

In some embodiments, the control module 40 receives the one or more sensor signals input from sensors 31, 32, 33, and may receive other inputs, such as a vehicle speed signal 34. The control module 40 generates a command signal to control the steering actuator motor 19 of the steering system 12 based on one or more of the inputs and further based on the steering control systems and methods of the present disclosure. The steering control systems and methods of the present disclosure apply signal conditioning and perform friction classification to determine a surface friction level 42 as a control signal that can be used to control aspects of the steering system 12 through the steering assist unit 18.

The surface friction level 42 can also be sent as an alert to an ABS 44 and/or ESC system 46 indicating a change in surface friction, which may be further classified as an on-center slip (i.e., at lower handwheel angle) or an off-center slip (i.e., at higher handwheel angle) as further described herein. Communication with the ABS 44, ESC system 46, and other systems (not depicted), can be performed using, for example, a controller area network (CAN) bus or other vehicle network known in the art to exchange signals such as the vehicle speed signal 34.

In case of the ADAS vehicles, as a human driver or operator of the vehicle 10 becomes less involved with vehicle (steering) control, the added human sense of failure detection is also displaced. For electro-mechanical systems like the EPS 12, the reliance on the driver's perceptions as a detection mechanism (such as noise) prior to failure is leveraged during the design phase of the EPS 12 to classify failure mode severity. As noted, Level 3 autonomy requires that execution of and monitoring of (the) driving environment be handled by a system while the fallback performance of dynamic driving tasks be the responsibility of a human driver.

Figure 4:
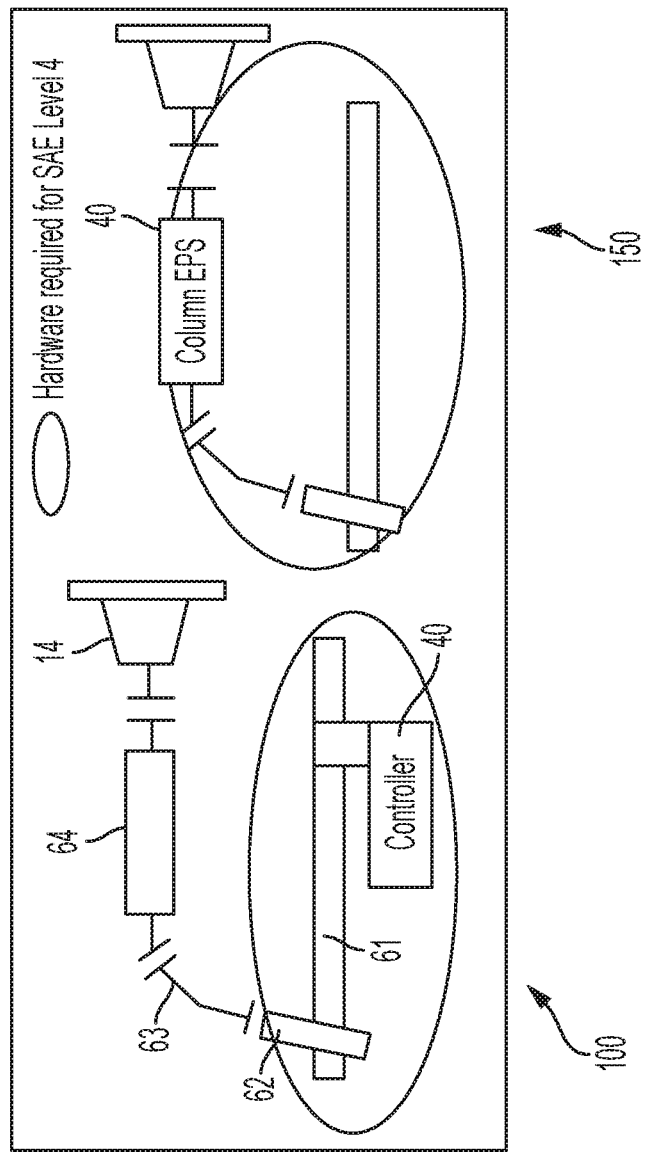
FIG. 4 generally illustrates an overview of a rack-based electric power steering (EPS) system and a column-based EPS system according to the principles of the present disclosure.

FIG. 4 illustrates an overview of a rack-based electric power steering (EPS) system 100 and a column-based EPS system 150 according to one or more embodiments. In the rack-based EPS system 100, a controller 40 uses signals from the rack to provide motor assist, and in the column-based EPS system 150 the controller 40 uses signals from/to the column to provide motor assist. Typically, a rack-based EPS system 100 is used for higher output EPS applications (SUV, FST, and LCV), where the motor assist is in line with the steering rack (under hood) between the road wheels. Whereas, a column-based system 150 is typically used for smaller vehicles (segments A-C) and the motor assist is integrated into the steering column (in cabin) which transmits force through the I-shaft and into the steering linkage.

If the rack EPS system 100 receives an autonomous command over a controller area network (CAN) bus (not shown) from a vehicle subsystem, such as an electronic control unit (ECU) (not shown), any motion to the rack 61 causes a reaction in pinion 62, I-shaft, column 64 and handwheel 14 in the rack-based system 100. For this configuration, change of motion in the 'idle' hardware will create a negative torque reading on the torsion bar (due to inertia) that will oppose the desired direction and subtract from system direction. In a Level 3 system, which supports conditional automation, the driver input hardware, such as the handwheel 14 causes inertial impacts on the EPS system 100. In Level 4, the EPS system 100 operates in autonomous control mode, the steering hardware for Level 4 autonomy contradicts what exists today and what is Level 3 demands. For example, the inertial impacts from the driver input hardware (handwheel) 14 in Level 3 EPS systems can affect performance in the Level 4 EPS system.

Similar challenge exists in the column EPS system 150. For example, in the column-based EPS system 150, the handwheel 14 itself causes non-desired inertia effects (negative inertial performance), which in the rack-based configuration is caused by the combination of the I-shaft, the column 64 and the handwheel 14. It should be noted that the technical solutions described herein address the challenges of the negative inertial performance in either configuration, rack-based or column-based.

Further, diagnostics present a challenge for the EPS system 12 to adapt to the Level 4 autonomy standards. Consider the rack EPS system of FIG. 4. For the EPS system 100 to function in a Level 3 mode of conditional autonomy, torque sensor diagnostics are used to ensure that a human driver can intervene (via torque sensor) as a fallback driving opportunity, and thus, diagnostics must be functional and fault-free). When that same set of hardware is functioning in the Level 4 autonomous mode, a triggered torque sensor diagnostic may potentially inhibit assist if it is not rationalized accurately.

Accordingly, the technical solutions described herein facilitate an EPS system 12 to determine the mode of operation (for example, Level 3, Level 4 and so on) and further transition from one mode to another.

Figure 5:
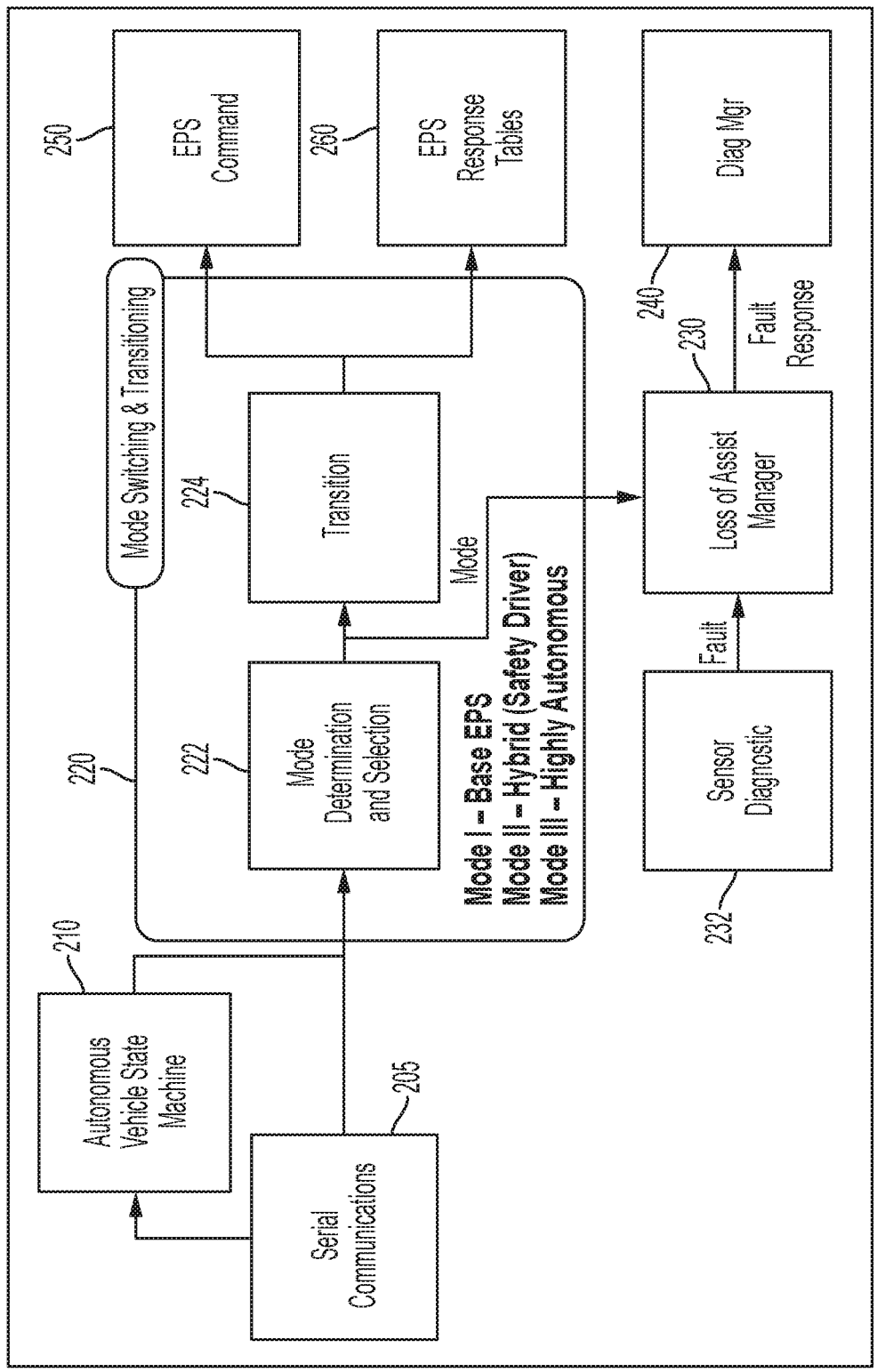
FIG. 5 generally illustrates a block diagram for determining steering mode and transitioning between the steering modes according to the principles of the present disclosure.

FIG. 5 illustrates a block diagram for determining steering mode and transitioning between the steering modes according the principles of the present disclosure. The steering mode may be referred to as an operating mode, or an operation mode, and is indicative of a level of autonomous driving being used by the vehicle 10 that is equipped with the EPS system 12.

The EPS system 12 receives vehicle operation information from a variety of sources. For example, the EPS system 12 receives information from overlay handler inputs, diagnostic configuration services, CAN signals from the vehicle 10 or a vehicle autonomy kit 210, and native EPS signals (for example, handwheel torque, motor position, motor velocity, motor torque command) and so on. In one or more examples, such information is received by the EPS system 12 in the form of one or more serial bus communication signals 205. It should be noted, that in other examples, the information may be received in any suitable manner or form, such as parallel communication, wireless communication, and the like.

The vehicle autonomy kit 210 includes a vehicle subsystem that sends instructions regarding operating mode. For example, the vehicle autonomy kit 210 receives instructions from an operator, for example via a user-interface to switch from one operating mode to another, for example, driver-based mode to autonomous mode. In response, the vehicle autonomy kit 210 sends corresponding instructions to the one more vehicle subsystems of the vehicle 10, including the EPS system 12, indicating the requested operation mode by the operator. In one or more examples, the vehicle autonomy kit 210 is proprietary to the vehicle manufacturer and issue instructions to the EPS system 12 using a predetermined protocol and/or standard format.

The EPS system 12, for example as part of the control module 40, includes an advance driver assist module 220. In one or more examples, based on the received information, the advance driver assist module 220 determines a current mode of operation and a requested new mode of operation. For example, the advance driver assist module 220 determines that the vehicle 10 is operating in Mode I—Base EPS mode, in which the EPS system 12 delivers performance in SAE Level 0, which is no automation. Further, in Mode II—Hybrid mode, in which the EPS functions in SAE Level 3, which is conditional automation, where the operator can take over the operation of the EPS system 12 using the handwheel 14. Further yet, Mode III—a highly autonomous mode, in which the EPS system 12 functions in SAE Level 4 that is complete autonomy, where the operator cannot take over the control of the steering using the handwheel 14. Based on determining the operating mode, the advance driver assist module 220 varies the performance of the EPS system 12 according to each operating mode. For example, the EPS system 12 provides different functionality (calibrations) within the different operating modes.

In one or more examples, the advance driver assist module 220 includes an operating mode-monitoring module that distinguishes between the operating modes by detecting driver intervention through handwheel torque along with the state of the overlay handler. For example, the intervening handwheel torque is measured, and based on an amount of the intervening handwheel torque and a current operating mode; the operating mode-monitoring module determines a new operating mode for switching the operating mode of the vehicle 10. In other examples, the operating mode-monitoring module is separate from the advance driver assist module 220.

Additionally or alternatively, the operating mode-monitoring module is implemented by the control module 40. For example, the operating mode-monitoring module monitors an amount of the operator provided torque, that is handwheel torque, to the handwheel 14 over a period, for example based on the torque sensor. If the operator is not providing any amount of torque to the handwheel over at least a predetermined amount of time, the operating mode-monitoring module determines that the EPS system 12 is being used in an autonomous mode, mode II or mode III. Alternatively, if a continuous presence of handwheel torque (of different/same value) is detected, the EPS system 12 is being operated in a human operated mode.

Alternatively, or in addition, the operating mode-monitoring module monitors additional signals internal to the EPS system 12 and/or other vehicle subsystems of the vehicle 10, such as the brake subsystem. The operating mode-monitoring module provides a control signal to the advance driver assist module, the control signal being indicative of the determined operating mode.

Upon determining that the operating mode is to be switched, the advance driver assist module 220 adjusts EPS commands 250 that are sent to the EPS system 12, for example an assist torque command that generates assist torque for the operator when operating the vehicle 10. The advance driver assist module 220 thus facilitates transitioning between two operating modes. For the operator, a smooth transition from a first operating mode to a second operating mode is desired.

Alternatively or in addition, the operator desires to know when the transition is occurred to be aware that the advance driver assist module 220 is/is not in control of the steering. For example, the advance driver assist module 220 provides a transparent transitioning (to human driver) between operating modes by integrating two instances of sets of calibration values for the EPS system 12 that affect steering feel and by switching one or more features of the EPS system 12 ON/OFF during the transition.

As described, a transition phase can be a technical challenge, more specifically if the vehicle 10 is equipped with a steer-by-wire system operating in quiet wheel mode (steering wheel does not rotate to follow the actual road wheels angle) during the autonomous driving. An instantaneous switch of steering control based on exact angle matching (driver and robot) leads to an unstable (vehicle stability) and non-intuitive situations (driver not capable of predicting the exact angle). The one or more embodiments described herein facilitate such steering mode transition management. One or more examples provide an adaptive transition of steering control from the robot (autonomous mode; Level 4) to the driver (Level 2/3) that ensures driver safety (vehicle stability) and increases intuitiveness of the transition.

Figure 6:
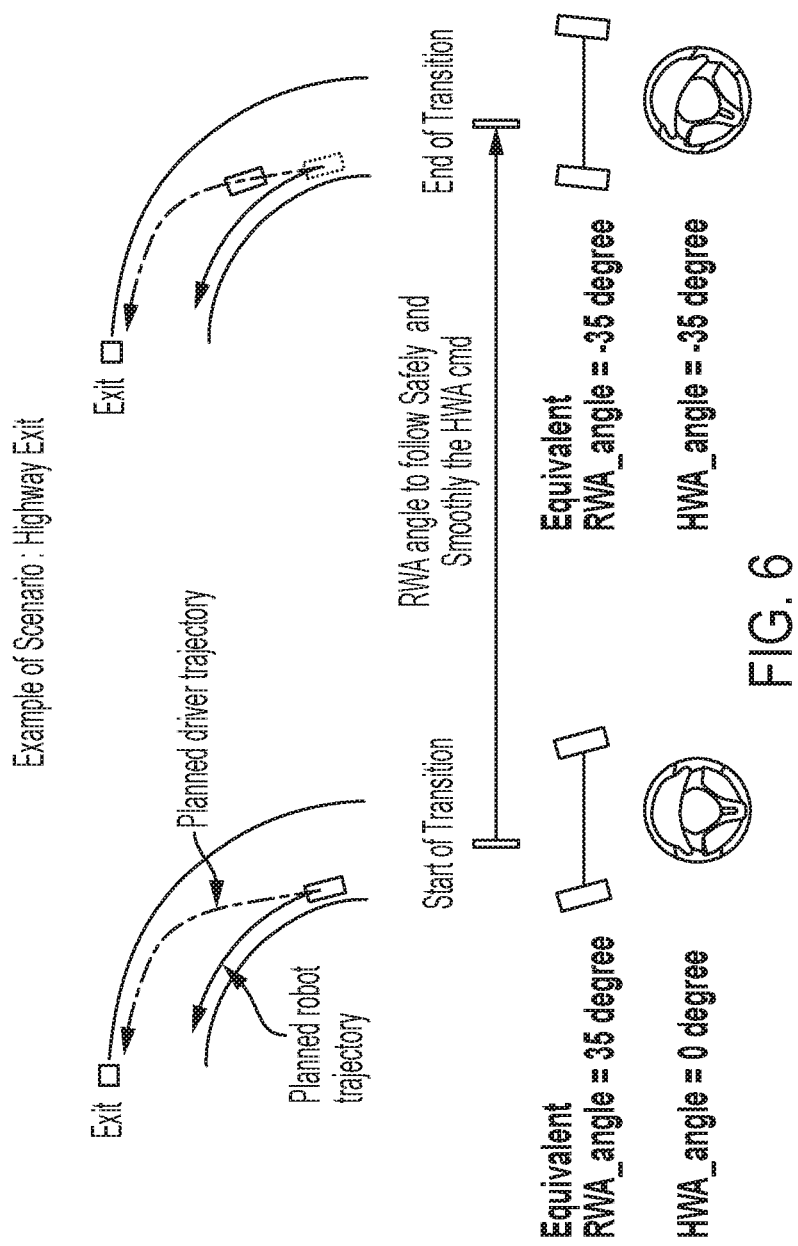
FIG. 6 generally illustrates a vehicle scenario according to the principles of the present disclosure.

FIG. 6 depicts an example scenario. Here, before the start of transition, the ADAS had a first planned trajectory, which is replaced a second planned trajectory that the human driver desires to use. The corresponding RWA angles for the two planned trajectories are different. Furthermore, before the start of the transition, when the first planned trajectory is being used the RWA angle and the HWA angle are not synchronized, with the HWA being in a central position (in this example). Once the human driver takes steering control, the HWA and the RWA angles are to be synchronized (at end of transition). The technical solutions described herein facilitate an adaptive transition in which the RWA angle to follow safely and smoothly the HWA command as the transition from the ADAS to the human driver occurs.

The adaptive transition of steering control relies on two indicators and two steps to achieve safe and smooth transition. The two indicators are error budget: defined by the maximum allowed error between the driver and the robot angles to ensure safe transition; and time budget: defined by the time required to achieve transition of steering control with smooth vehicle dynamics.

The first of the two steps is transition initiation: driver back to the driving loop (haptic guidance). Here a safe transition is based on the error budget. The driver puts his/her hands on the steering wheel (equipped with hands-on detection function) and starts rotating according to the second vehicle trajectory with the help of torque feedback guidance. The second step includes transition of steering control: steering control back to the driver. Here, the road wheels are smoothly moved to match the driver angle command within the time budget. This phase begins once the actual error is lower than the error budget.

Figure 7:
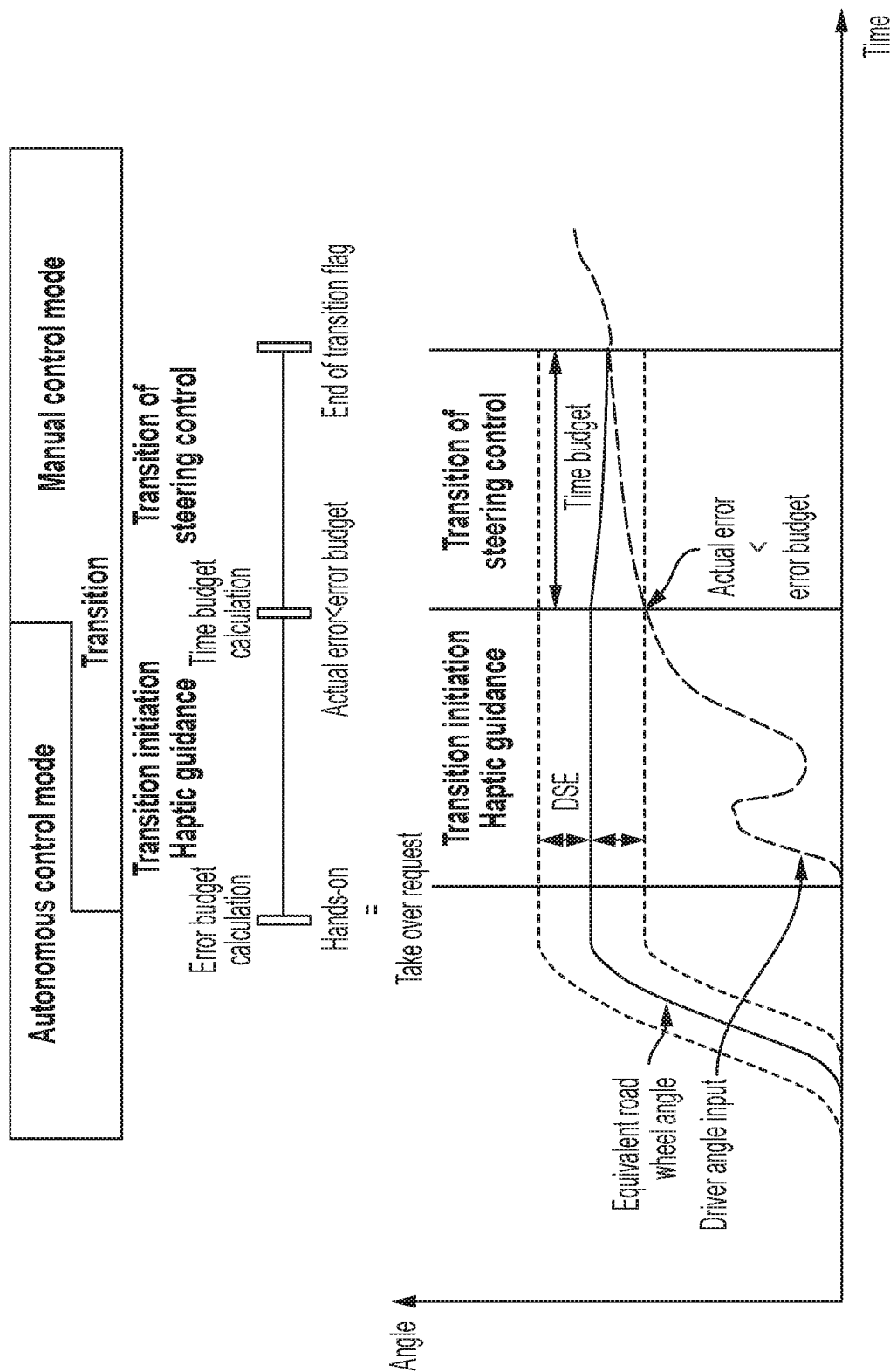
FIG. 7 generally illustrates a visual representation of a transition management according to the principles of the present disclosure.

FIG. 7 depicts a visual representation of the transition management according to one or more embodiments. The error budget, the time budget, and the alpha blending shape are calculated/defined also based on other vehicle dynamics signals (yaw rate, lateral speed, model . . . ), driver state, and driving situation. As shown, an initial transition phase is performed to bring the driver back to the driving loop for safe transition based on error budget indicator. Further, haptic guidance is provided to get the driver back to the driving loop in an intuitive manner. Subsequently, a smooth transition of steering control from the ADAS to the driver is performed using the adaptive time budget indicator. The time for transition of steering control is dynamic and variable and depends on vehicle dynamics, driver state, and driving situation. The error budget calculation, time budget calculation, and blending (shape) are tunable/configurable.

Figure 8:
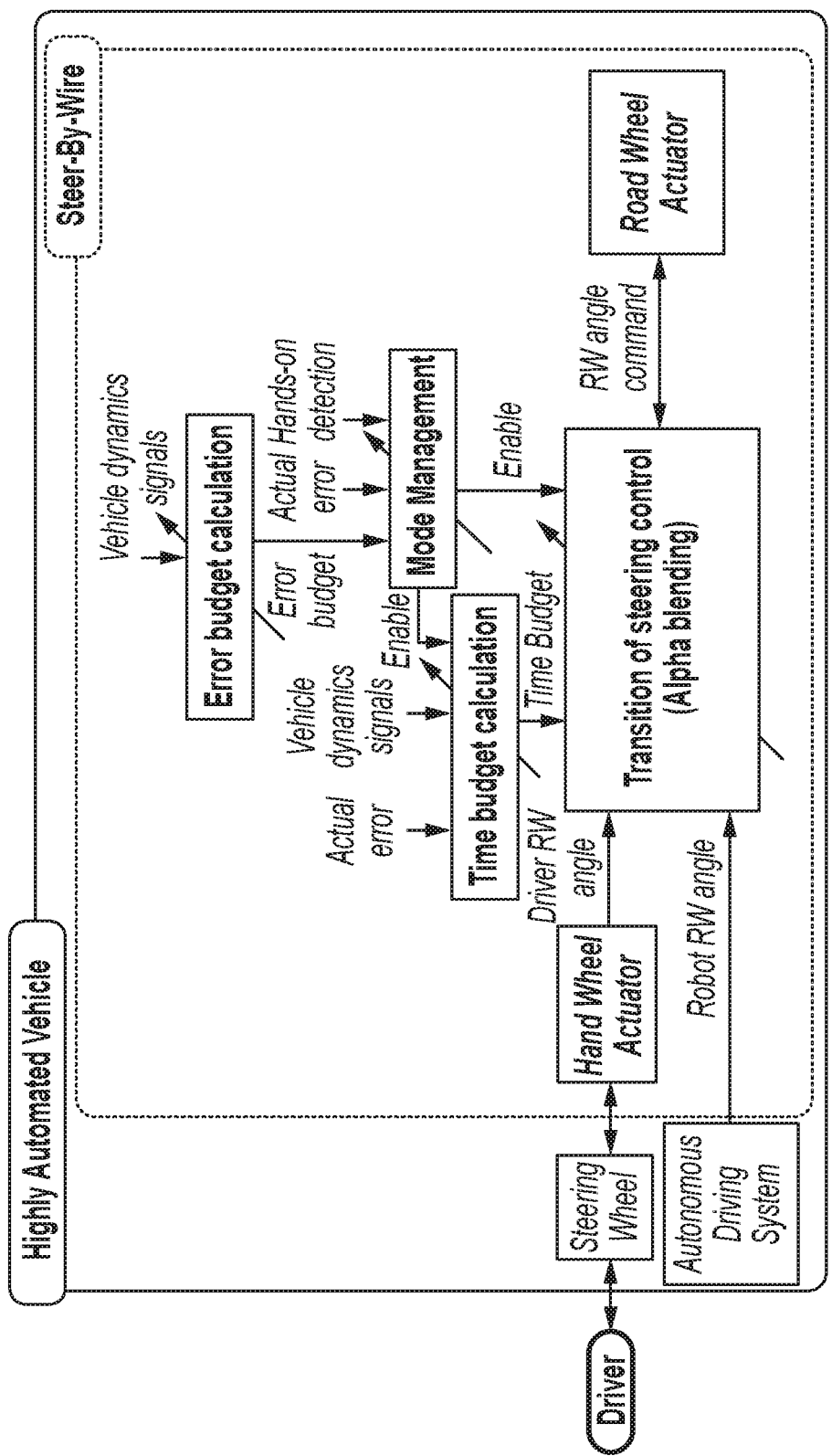
FIG. 8 generally illustrates a block diagram of a steering control mode transition management system according to the principles of the present disclosure.

FIG. 8 depicts a block diagram of an example steering control mode transition management system according to one or more embodiments. The block diagram depicts various blocks for performing the various operations described herein. The one or more blocks are coupled with the various components of the steering system, such as the HWA, the RWA, as well as other components, which may or may not be part of the steering system, such as the steering wheel, the ADAS etc.

During the transition, due to driver loss of situation awareness (because ADAS is in control so far), the driver's actions in terms of steering inputs could be incoherent with the first planned vehicle trajectory from the ADAS during the first seconds of the transition of steering control. Such a technical challenge is addressed by one or more embodiments of the technical solutions described herein. For example, in one or more embodiments, an adaptive haptic feedback is provided that guides the driver to get back to the driving loop and helps him/her increasing his driving performance.

Figure 9:
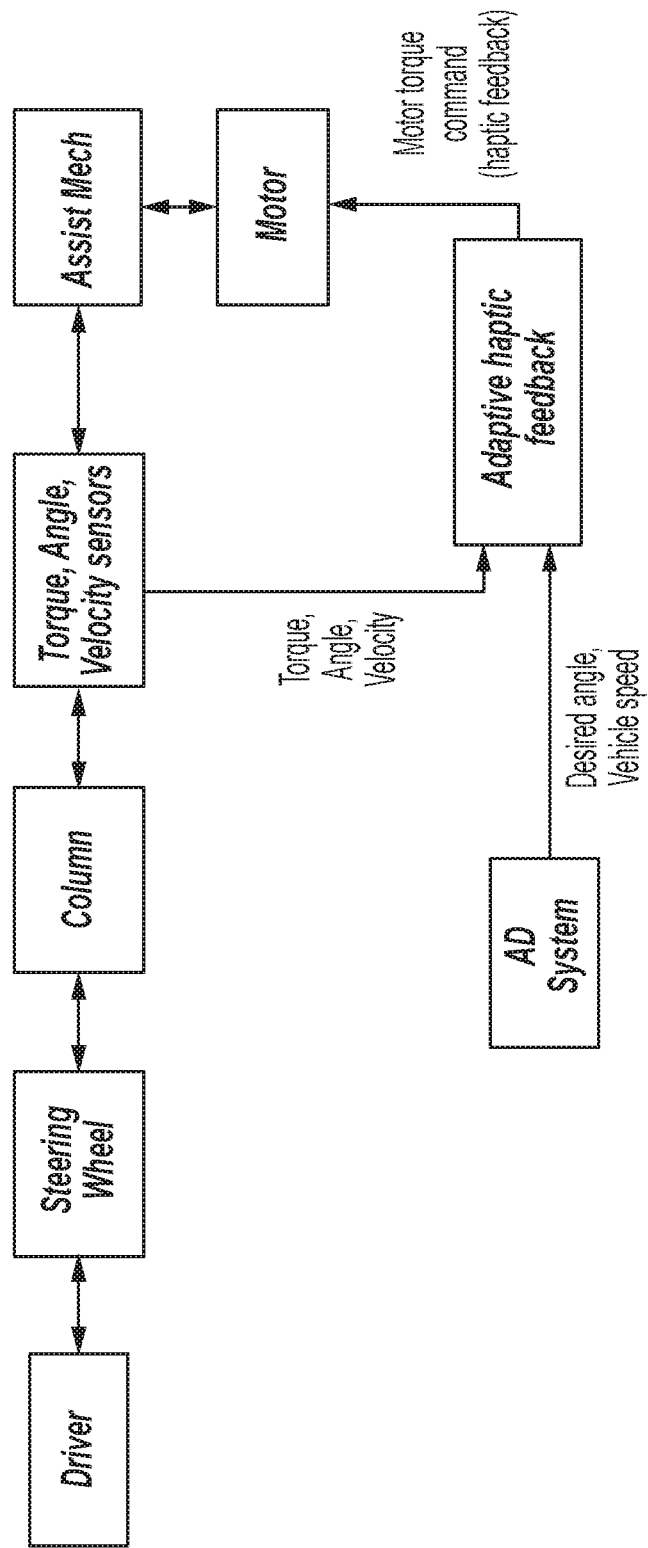
FIG. 9 generally illustrates a block diagram of a system for generating haptic feedback to guide a driver when transitioning steering control from autonomous mode to manual mode according to the principles of the present disclosure.

FIG. 9 depicts a block diagram of an example system for generating haptic feedback to guide the driver when transitioning steering control from autonomous mode to manual mode according to one or more embodiments. The adaptive haptic feedback is generated based on the first planned trajectory from the ADAS, the second planned trajectory based on the driver's input, and other vehicle dynamics, such as vehicle speed, yaw rate, and the like. The adaptive haptic feedback generates a torque command that is applied to a motor to generate torque. The generated torque is integrated/blended with assist torque provided to the driver.

Figure 10:
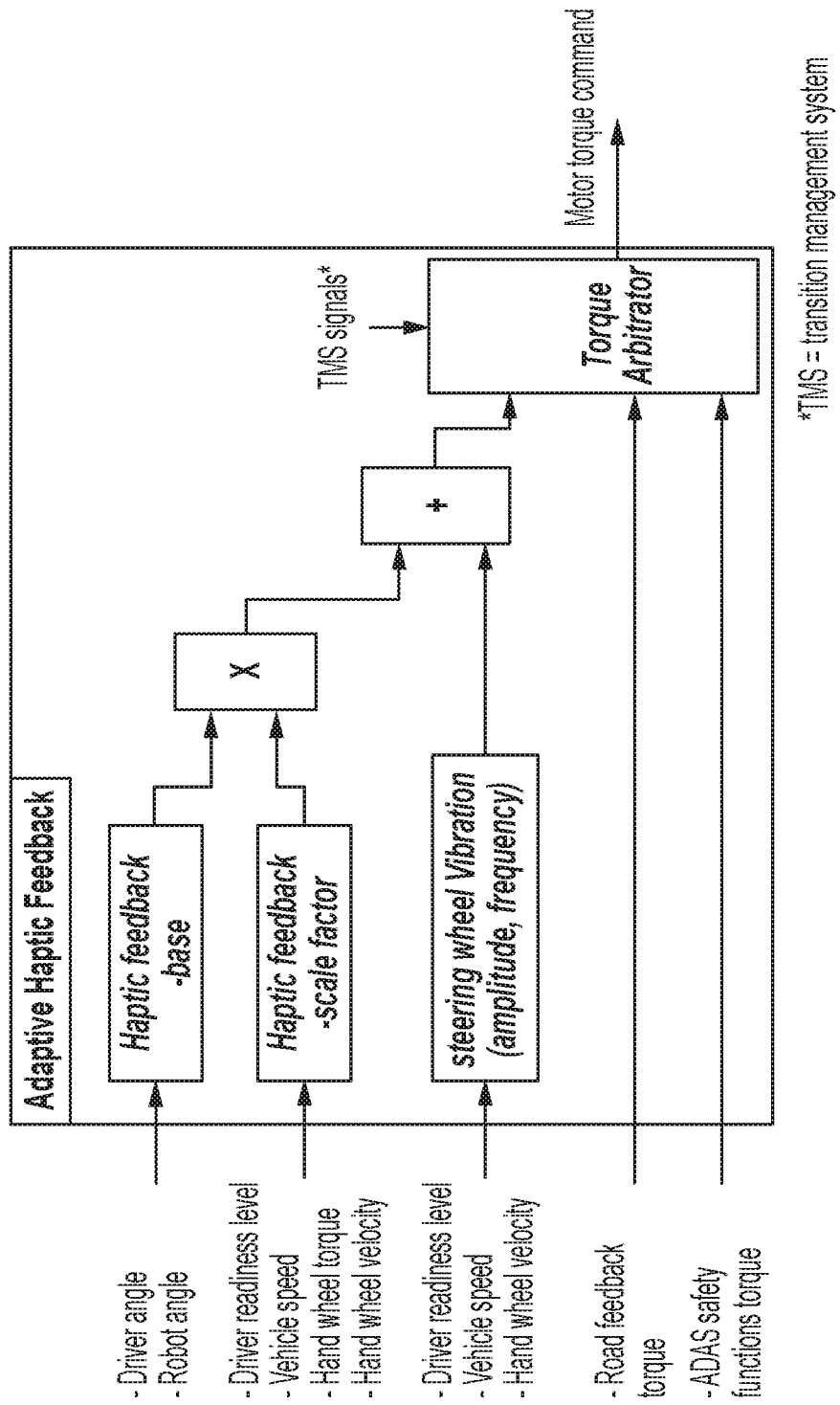
FIG. 10 generally illustrates a block diagram of a haptic feedback generation module according to the principles of the present disclosure.

FIG. 10 depicts a block diagram of an example haptic feedback generation module according to one or more embodiments. A first haptic feedback value is computed based on the driver provided manual mode control angle (e.g., based on the HWA determined from the handwheel torque, as described) and an ADAS provided autonomous mode control angle. The first haptic feedback value is scaled using a scaling factor. The scaling factor is dynamically generated based on a driver readiness level, a vehicle speed, a handwheel torque, a handwheel velocity, and other such vehicle dynamics signals. The scaling factor applied (multiplied) with the first haptic feedback value generates an adjusted/second haptic feedback value.

In one or more examples, the dynamic signals are further used to generate a steering vibration signal. The steering vibration signal is blended (e.g. added) with the adjusted haptic feedback.

A torque feedback arbitrator receives a road feedback torque, an ADAS safety functions torque, and the adjusted haptic feedback. The torque feedback arbitrator generates a motor torque command to generate handwheel torque based on these inputs.

Figure 11:
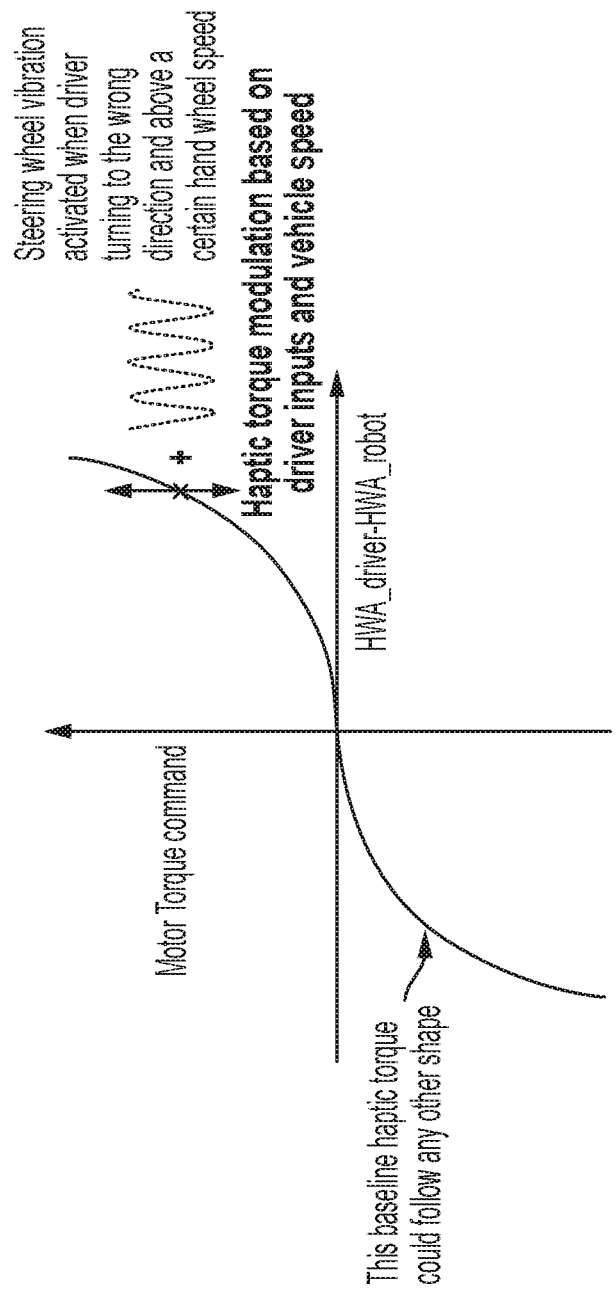
FIG. 11 generally illustrates a first haptic feedback computed at different input values according to the principles of the present disclosure.

FIG. 11 depicts an example first haptic feedback computed at different input values according to one or more embodiments. The shape of the curve of the first haptic feedback value can be different in other embodiments shown in FIG. 10. The vibration for the steering wheel can be blended if certain predetermined conditions are met.

Figure 12:
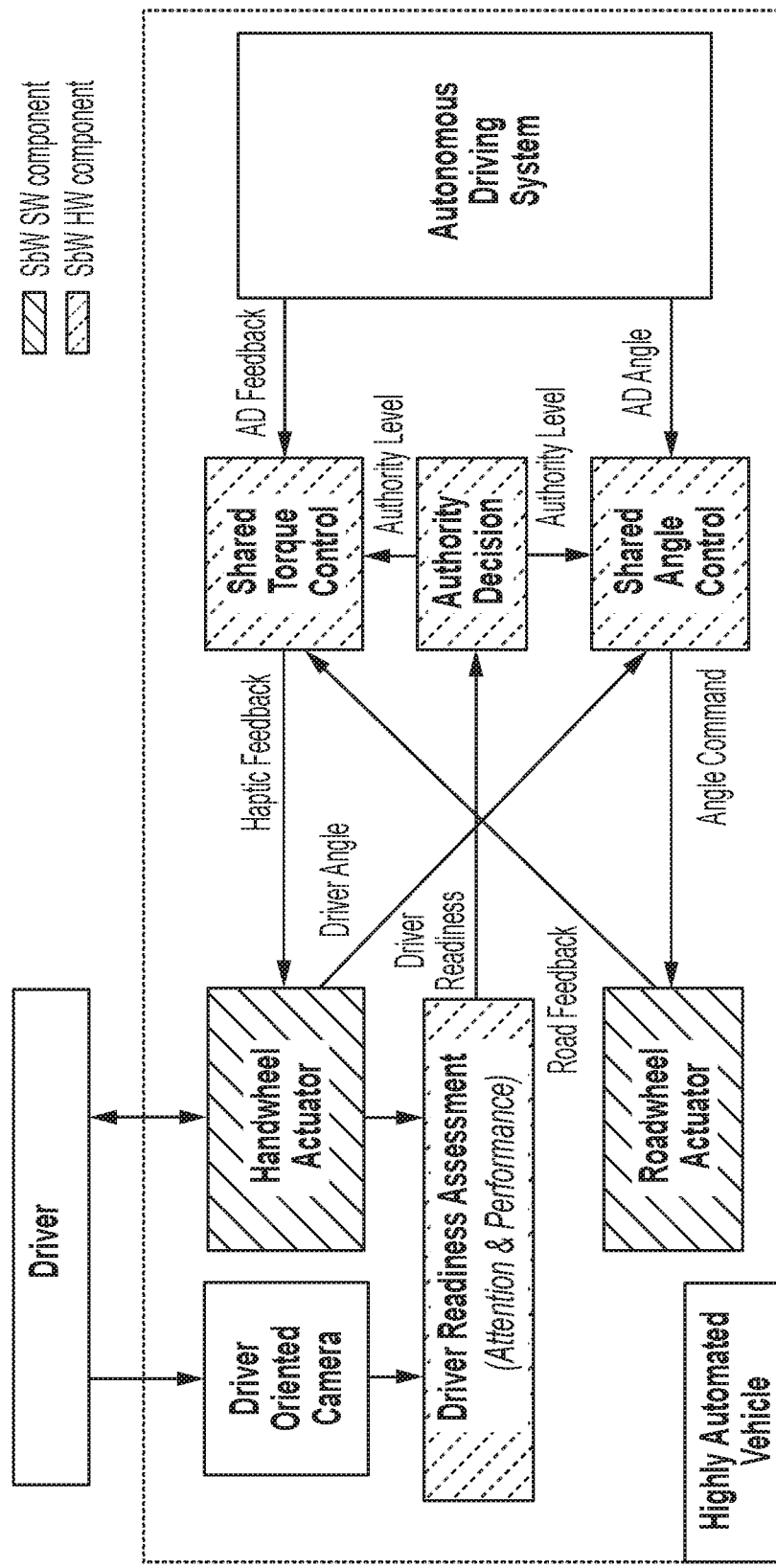
FIG. 12 generally illustrates a schematic illustration of an architecture for a shared control steering system of an autonomous vehicle according to the principles of the present disclosure.
Figure 13:
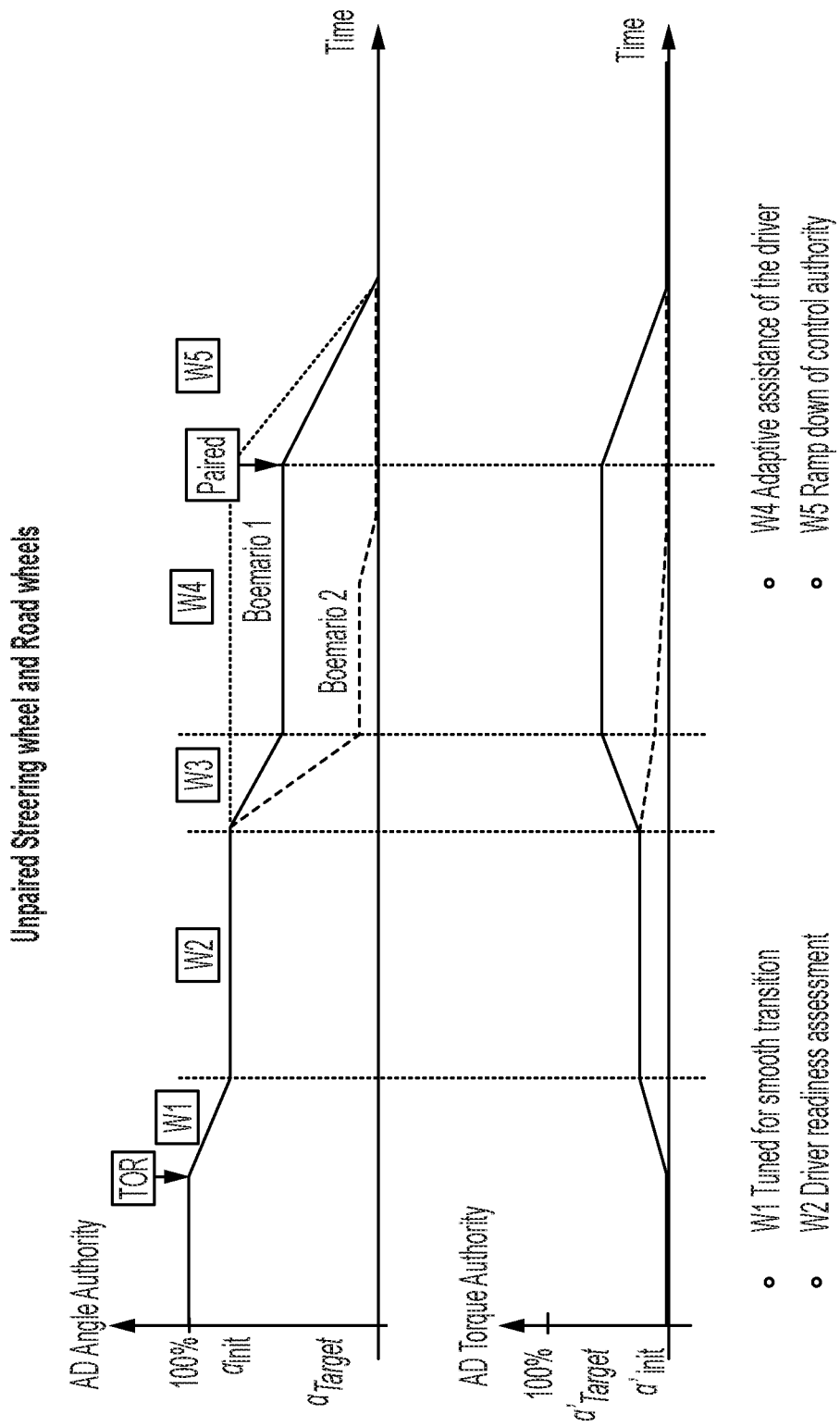
FIG. 13 generally illustrates a plot of an authority of an autonomous driving system over time for a steering wheel unpaired from road wheels according to the principles of the present disclosure.
Figure 14:
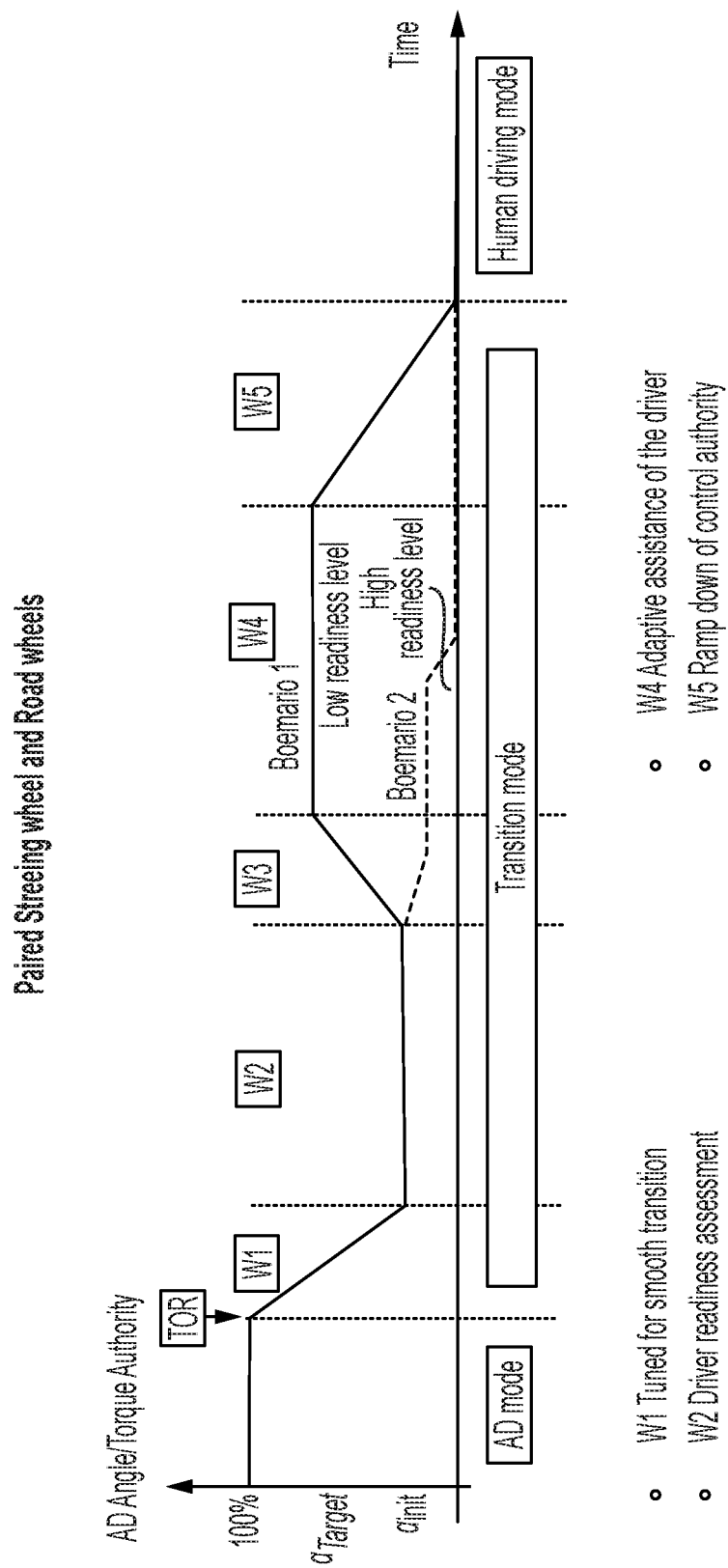
FIG. 14 generally illustrates a plot of the authority of an autonomous driving system over time for a steering wheel paired with road wheels according to the principles of the present disclosure.

FIGS. 12-14, generally illustrate a system and method associated with transitioning between an autonomous mode and a manual mode of driving (e.g., such that, driving tasks shared between the driver and an autonomous driving system, such as an ADAS, in a transition period will conclude to a smooth and continuous transition). Additionally, or alternatively, the driver (also referred to herein as an operator) may be guided during transition to make sure the driver's commands will be safe and within an acceptable range. Therefore, the system gives the driver a feeling of comfort and confidence during the transition.

Referring to FIG. 12, an embodiment of a shared control steering system is illustrated. The system includes a shared torque control module for the steering wheel actuator to provide haptic authority to the steering wheel. A shared angle control module is provided for the road wheel actuator to provide trajectory authority of the vehicle 10.

Another module referred to as an authority decision module calculates the level of driver authority and robot authority is included in some embodiments. Other authority decision schemes may be relied upon in some embodiments.

A driver may initiate transition from the manual driving mode to the autonomous driving mode, and vice versa, in any suitable manner. This may involve interaction with a button, switch, knob, lever, or the like, or movement of the steering wheel in a predetermined manner. Alternatively, a voice command is contemplated. Regardless of the precise manner in which initiation of transition is performed, the embodiments described herein manage the transition to the manual driving mode from the autonomous driving mode to ensure that the driver is inputting commands that substantially correspond to the commands being provided by the autonomous driving system.

Referring now to FIG. 13, blended control during in the form of steering angle authority and steering torque authority during a transition from an autonomous driving mode to a manual driving mode is illustrated for an unpaired steering wheel and road wheel arrangement. In particular, the plots represent an intuitive and safe transition through a controlled profile of the transfer of angle and torque control authority. The takeover request (TOR) from the driver initiates an evaluation of whether hands on wheel is detected and proper eye gaze is detected.

If the eye gaze is not indicative of an aware driver, a haptic feedback notification is provided to the steering wheel to alert the driver. In the illustrated plots, the durations referenced with W1, W2, W3 and W5 are tunable, as is a_init. a_Target and time period W4 are calculated based on a driver readiness assessment performed during time period W2. The assessment may include steering and eye gaze performance analysis. During W2 and W4, the autonomous driving system will provide assistance to the driver at the operational (e.g., vehicle stability and lane keeping) and tactical levels (e.g., trajectory change). The level of assistance of the autonomous driving system during W4 may be lower or higher depending on the driver performance during period W2.

Referring now to FIG. 14, blended control during in the form of steering angle authority and steering torque authority during a transition from an autonomous driving mode to a manual driving mode is illustrated for a paired steering wheel and road wheel arrangement. In particular, the plot represents an intuitive and safe transition through a controlled profile of the transfer of angle and torque control authority. The takeover request (TOR) from the driver initiates an evaluation of whether hands on wheel is detected and proper eye gaze is detected. If the eye gaze is not indicative of an aware driver, a haptic feedback notification is provided to the steering wheel to alert the driver.

In the illustrated plots, the durations referenced with W1, W2, W3 and W5 are tunable, as is a_init. a_Target and time period W4 are calculated based on a driver readiness assessment performed during time period W2. The assessment may include steering and eye gaze performance analysis. During W2 and W4, the autonomous driving system will provide assistance to the driver at the operational (e.g., vehicle stability and lane keeping) and tactical levels (e.g., trajectory change). The level of assistance of the autonomous driving system during W4 may be lower or higher depending on the driver performance during period W2.

In some of the embodiments described herein may provide a flexible steer-by-wire architecture that provides customers beneficial interfaces to implement their own high-level transition management algorithms. Ability for the steer-by-wire system to consider authority levels of the driver and robot is provided by an external electronic control unit (ECU) at two levels, specifically haptic feedback to the steering wheel and vehicle trajectory to the road wheel actuator. The embodiments also decouple authority levels for the haptic feedback and the vehicle trajectory.

Some embodiments described herein may provide for a transition of the steering control from an entirely ADAS controlled mode to a human driver controlled mode. Further, such transition facilitates a change in a planned trajectory of the vehicle 10 from a first planned trajectory according to the ADAS to a second planed trajectory according to the human driver.

Some of the embodiments described herein further facilitate generating haptic feedback for a steer-by-wire system in an adaptive/dynamic manner. The adaptive haptic feedback guides the driver to get back to the driving loop in intuitive manner and helps him/her increasing the driving performance. The haptic torque is calculated based on signals related to the driver and to the autonomous driving system. Vehicle speed and driver readiness level are used to modulate the level of haptic feedback. Steering wheel vibration is activated when the driver is turning the handwheel to the wrong direction, based on the first planned trajectory, in one or more examples. Further, a torque arbitrator is used to ensure smooth transition from haptic feedback torque to road feedback torque (full human driving mode). In one or more examples, the torque arbitrator is also used to manage torque from ADAS safety functions (e.g., collision avoidance) during the transition phase. It should be noted that the calculations described herein are tunable (shape and amplitude) to meet customer expectations.

Some of the embodiments described herein pertain to a system and method associated with the steering system of the vehicle 10, which may be employed with various types of steering columns. In particular, electric power steering systems and autonomous or semi-autonomous driving systems are examples of vehicle steering columns that may benefit from the embodiments disclosed herein.

The control system may include one or more controllers and processors that may be integrated with each other to store and receive data, process computations, and execute commands. In an autonomous steering mode, a driver is not required to provide steering control via the steering input device. In the event the driver desires to regain steering control of the vehicle 10, a prompt is submitted to transition the steering control back to the driver. Full driver steering control may be referred to as a manual steering mode of the vehicle 10.

Transitioning from the autonomous steering mode to the manual steering mode, in what is referred to as a transition steering mode, must be handled with many considerations due to the dynamic factors associated with steering the vehicle 10. To execute a safe and intuitive transition from the autonomous steering mode to the manual steering mode, the embodiments described herein and illustrated in the Figures evaluate driver readiness to determine if the transition mode may be safely completed to fully switch the vehicle to the manual steering mode.

Figure 15:
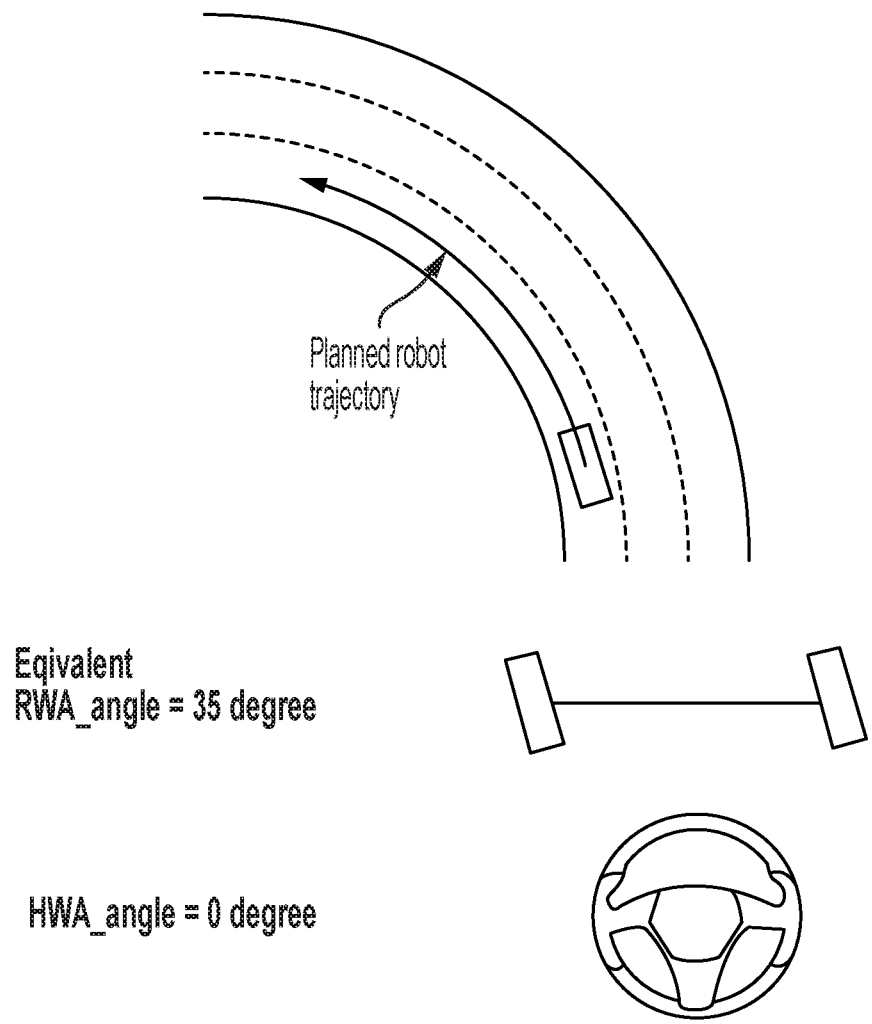
FIGS. 15-17 generally illustrate an embodiment of a driver readiness evaluation system according to the principles of the present disclosure.

FIG. 15 illustrates a path that a vehicle, such as the vehicle 10, is projected to move along under the control of an autonomous steering system (e.g., robot). The projected path may include curving maneuvers, where a reliable driver readiness evaluation is of even greater importance in such situations. In the illustrated example, the road wheel angle is in a non-straight ahead (i.e., 0 degree or 12 o'clock) position, however, the hand wheel used for manual steering control is at a straight ahead position, or some other position that does not correspond to the road wheel angle position. This may be the case in steer-by-wire systems and autonomous systems with a non-rotational steering wheel capability.

Figure 16:
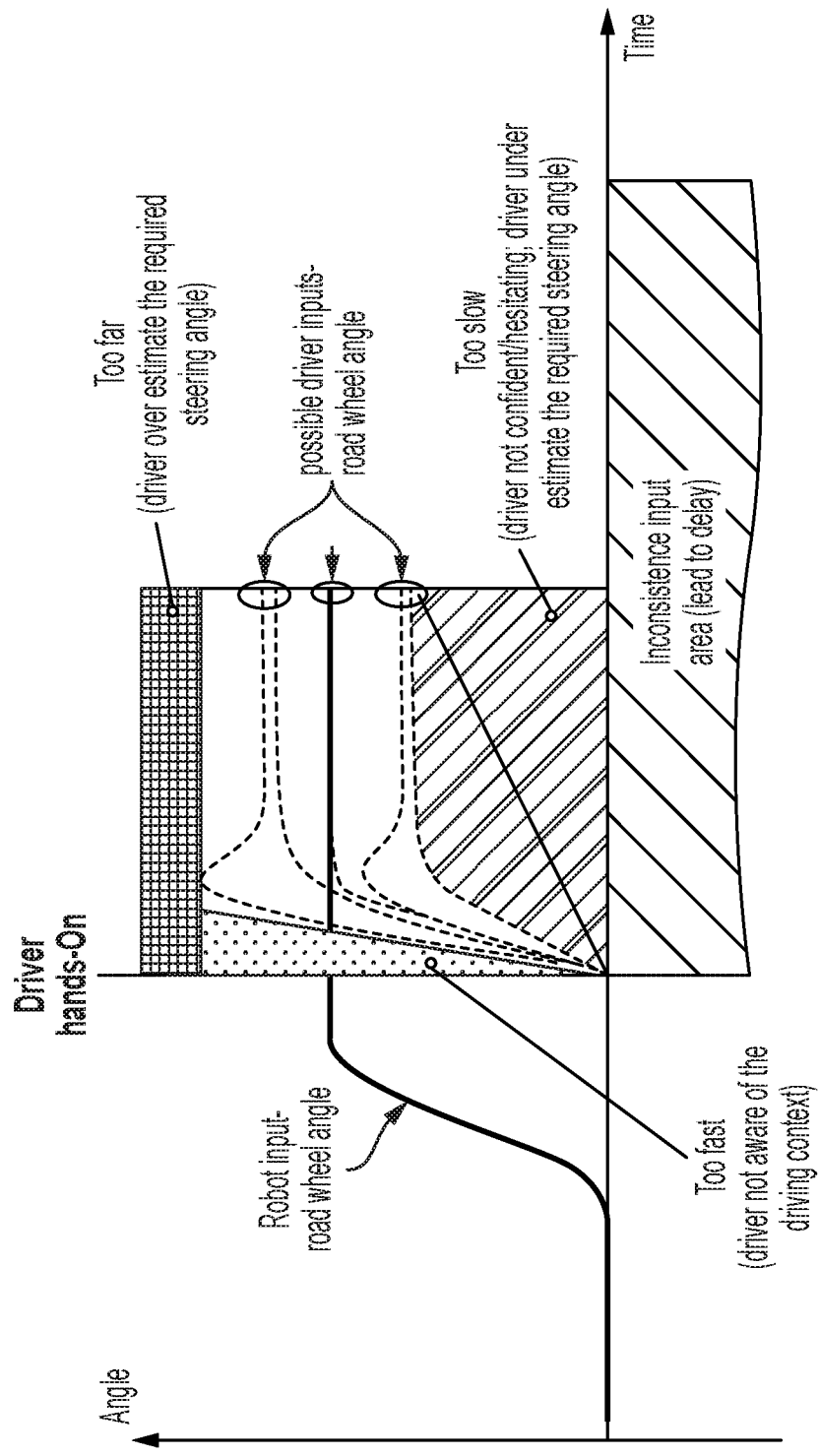

FIG. 16 illustrates a plot of steering angled driver inputs over time. Initially, the vehicle 10 is in an autonomous driving mode. Some levels of autonomous driving vehicles allow a human vehicle operator to take over from the automated driving mode. The operator can request to operate the vehicle 10 while the vehicle 10 is being operated in the autonomous driving mode without having been issued a request to intervene by the autonomous driving system. In these cases, the autonomous driving system delays relinquishing control to the manual driving mode to ensure a smooth transition to the manual driving mode, both for operator comfort and/or to prevent a hazardous condition from occurring.

At the time denoted "Driver hands-on", a prompt is made that alerts one or more vehicle control systems that the manual driving mode is desired or required and the transition driving mode is initiated. Transition to a manual steering mode is not made until satisfaction of various driver readiness parameters. In particular, as shown in FIG. 16, the autonomous driving system (e.g., robot) steers the vehicle 10 with a road wheel angle input that is desired for the projected path of the vehicle 10.

At the "Driver hands-on" time, the operator/driver begins to provide steering angle inputs with the steering wheel. Various driver input situations are illustrated in relation to the robot steering angle input. These inputs are compared to determine if the driver is ready to take over manual steering control of the vehicle 10. Specifically, if the driver's inputs are within an acceptable input envelope (e.g., range), when compared to the robot input, the transition to manual driving mode will continue and/or complete. As shown, the driver may provide inputs that are deemed acceptable (i.e., within envelope), or as underestimating or overestimating the necessary steering wheel angle input. These inputs may indicate that the driver is not aware of the driving situation/context or that the driver is not confident and is hesitant. Any inconsistency in acceptable driver steering angle inputs leads to a delay in the transition to the manual driving mode.

Figure 17:
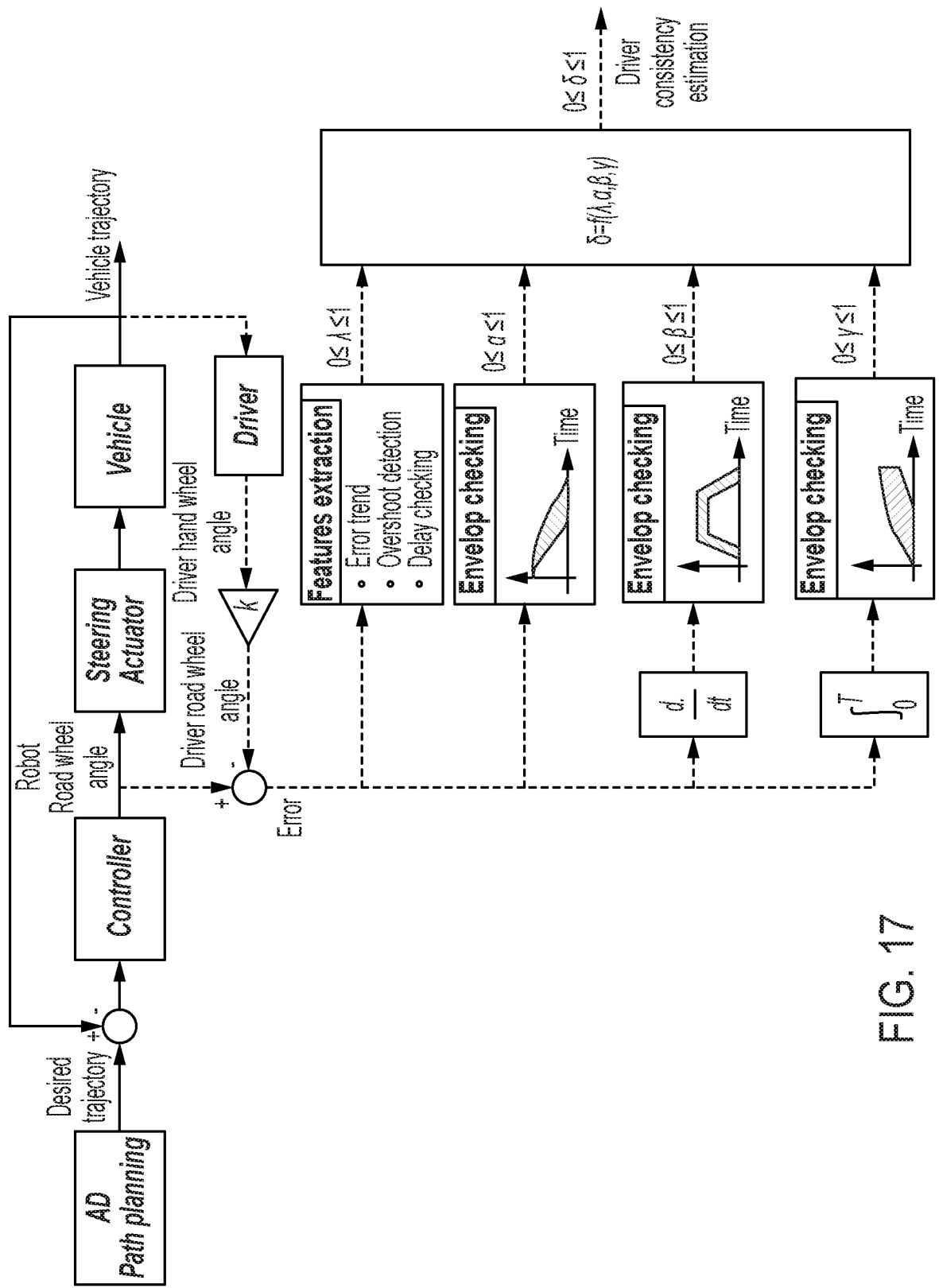

The above-described analysis evaluates the consistency of the driver steering inputs with regards to the robot steering inputs based on error analysis. The output of the algorithm may enhance the transition of steering control from the robot to the driver. In particular, the driver consistency evaluation uses mathematical processing of the error combined with typical driver reaction knowledge (above described envelop) to take over steering control of the vehicle 10. The estimation modeling is schematically illustrated in FIG. 17.

The embodiments described herein provide a driver awareness estimation system and method that combines input extraction with envelope checking to estimate driver readiness. The envelope that defines the acceptable boundaries of driver steering input angle is tunable, as is the time duration of the evaluation. The envelope may be dynamic based on vehicle dynamics. The driver awareness estimation could be used by a haptic feedback algorithm for better guidance of the driver to the robot-projected path during and/or after the estimation process. A confirmation time based on the driver awareness estimation may be used to transfer instantaneously the control of the vehicle 10 to the driver.

Figure 18:
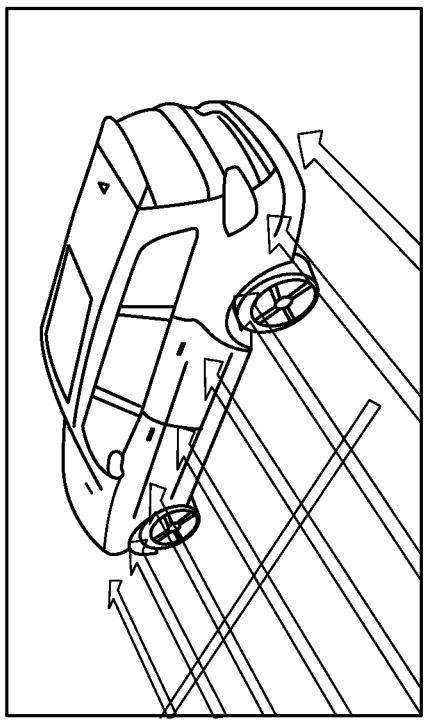

According to another embodiment of the disclosure, as illustrated in FIGS. 18-23, driver readiness may also be analyzed based on a driver response—in the form of driver corrective actions—to an emulated unpredictable disturbance on the steering wheel. The disturbance is initiated when hands-on-wheel detection is made. The disturbance profile (i.e., shape and frequency—low or high) is converted to a motor torque command that is sent to the hand wheel actuator. The driver response in terms of handwheel torque, position and velocity is analyzed and a driver readiness level is estimated (FIG. 18).

Figure 19:
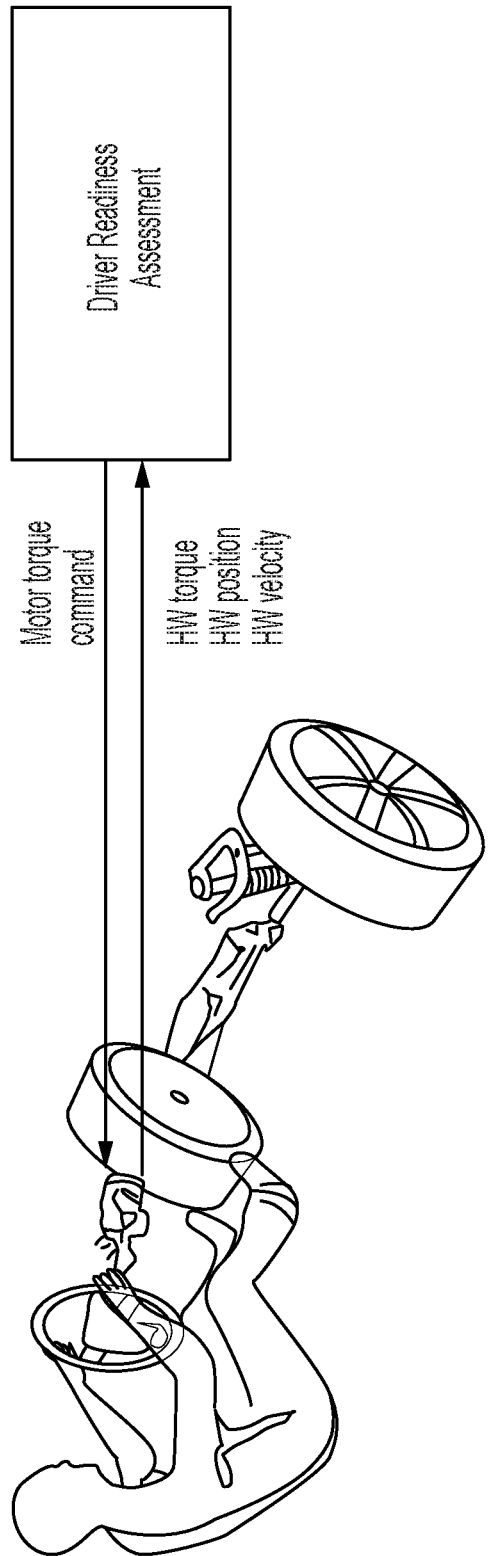
Figure 23:
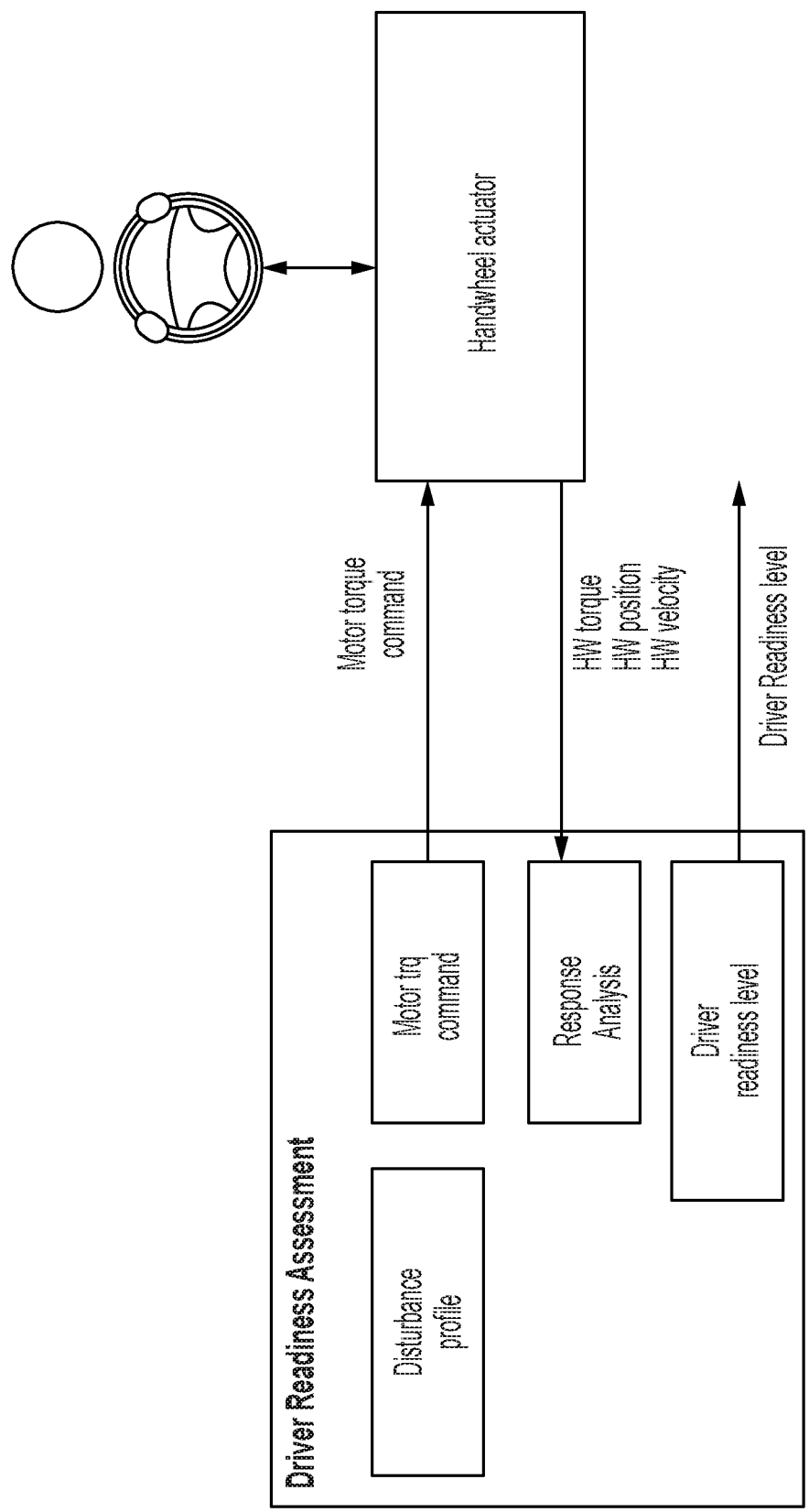

An example of an unpredictable disturbance is a crosswind effect on the vehicle 10 (FIG. 19). A crosswind generates lateral force on the tire-road contact path. The lateral force is converted through the suspension arm and the steering mechanism to a torque on the steering wheel. The driver response to this disturbance depends on his/her driving skills and state. FIGS. 20 and 21 illustrate motor torque commands for a steady crosswind (FIG. 20) and one or more wind gusts (FIG. 21) that are imposed on the feel of the steering wheel. As shown in FIG. 22, the driver response to the torques on the steering wheel is evaluated to determine if the driver is able to maintain the vehicle heading by resisting and/or compensating for the imposed torque. FIG. 23 illustrates a system block diagram schematically illustrating the driver readiness assessment.

The embodiments of FIGS. 18-23 provide a driver readiness assessment system and method for a steer-by-wire system operating in a non-rotational steering wheel state based on an unpredictable disturbance emulation. Use of hands-on detection initiates the simulated disturbance process and the simulation is used for transition of steering control in straight line and curved scenarios. The disturbance profile is selected based on the surrounding environment. The driver response analysis may use frequency and/or time domain methods. The embodiments described herein enhance safety during transition of steering control from the robot to the driver.

In some embodiments, a steer-by-wire steering system includes a processor configured to perform a method to manage transition of steering control from an autonomous control mode to a manual control mode. In some embodiments, the method includes computing an error budget based on maximum allowed error between an autonomous control mode angle and a manual control mode angle. In some embodiments, the method also includes computing a budget based on a time required to achieve transition of steering control with smooth vehicle dynamics. In some embodiments, the method also includes generating a position command to move the road wheels to match the manual control mode angle within the time budget.

In some embodiments, a steer-by-wire steering system includes a processor configured to perform a method to manage transition of steering control from an autonomous control mode to a manual control mode. The method includes computing a haptic feedback to guide a driver to change handwheel angle according to an autonomous control mode angle. In some embodiments, the method also includes computing a handwheel vibration and blending the handwheel vibration with the haptic feedback. In some embodiments, the method also includes arbitrating between the haptic feedback and road wheel torque to generate a motor torque command.

In some embodiments, a method is configured to manage transition of steering control from an autonomous control mode to a manual control mode. In some embodiments, the method includes computing an error budget based on maximum allowed error between an autonomous control mode angle and a manual control mode angle. In some embodiments, the method includes computing a time budget based on a time required to achieve transition of steering control with smooth vehicle dynamics.

In some embodiments, a method to provide a haptic feedback to guide a driver to change handwheel angle when transitioning from an autonomous control mode to a manual control mode includes computing a haptic feedback to guide a driver to change handwheel angle according to an autonomous control mode angle. The method also includes computing a handwheel vibration and blending the handwheel vibration with the haptic feedback. The method also includes arbitrating between the haptic feedback and road wheel torque to generate a motor torque command.

In some embodiments, a method of transitioning from an autonomous driving mode to a manual driving mode for a vehicle includes: receiving a takeover request from an operator; providing haptic feedback to the operator; performing a driver readiness assessment; and transitioning from an autonomous driving mode to a manual driving mode with a shared control transition mode, the shared control transition mode defined as a road wheel position partially controlled by an autonomous driving system and partially controlled by an operator input.

In some embodiments, a driver readiness assessment system includes an autonomous driving system controlling a road wheel angle during operation in an autonomous driving mode, the autonomous driving system generating a projected path of the vehicle. The system also includes a processor receiving a driver steering angle input during an evaluation period to compare the driver steering angle input to the road wheel angle for the projected path of the vehicle.

In some embodiments, a method of evaluating driver readiness includes: imposing a torque on a steering wheel; and evaluating a driver response to the imposed torque to determine readiness for a manual driving mode. In some embodiments, the imposed torque simulates a crosswind. In some embodiments, the imposed torque simulates one or more wind gusts.

In some embodiments, a system for providing operating mode transition for a vehicle includes a processor and a memory. The method includes instructions that, when executed by the processor, cause the processor to: receive an input indicating a request to transition from a first operating mode of the vehicle to a second operating mode of the vehicle; determine a first planned trajectory corresponding to the first operating mode; determine a second planned trajectory corresponding to the second operating mode; determine a first road wheel actuator angle corresponding to the first planned trajectory; determine a second road wheel actuator angle corresponding to the second planned trajectory; determine a difference between a current handwheel actuator angle and a handwheel actuator angle corresponding to the second road wheel actuator angle; and, in response to a determination that the difference is less than a threshold, transition from the first operating mode to the second operating mode over a determined period.

In some embodiments, the first operating mode includes an autonomous operating mode. In some embodiments, the second operating mode includes a manual operating mode. In some embodiments, the current handwheel actuator angle includes a zero degree angle. In some embodiments, the input indicates an operator engagement of a handwheel of the vehicle. In some embodiments, the input indicates a position of a switch within the vehicle. In some embodiments, the instructions further cause the processor to, in response to a determination that the difference is greater than the threshold, generate a haptic feedback torque based on the first road wheel actuator angle and the current handwheel actuator angle. In some embodiments, the instructions further cause the processor to provide an assist torque to a handwheel of the vehicle based on the first road wheel actuator angle and the haptic feedback torque.

In some embodiments, a method for providing operating mode transition for a vehicle includes receiving an input indicating a request to transition from a first operating mode of the vehicle to a second operating mode of the vehicle. The method also includes determining a first planned trajectory corresponding to the first operating mode. The method also includes determining a second planned trajectory corresponding to the second operating mode. The method also includes determining a first road wheel actuator angle corresponding to the first planned trajectory. The method also includes determining a second road wheel actuator angle corresponding to the second planned trajectory. The method also includes determining a difference between a current handwheel actuator angle and a handwheel actuator angle corresponding to the second road wheel actuator angle. The method also includes, in response to a determination that the difference is less than a threshold, transitioning from the first operating mode to the second operating mode over a determined period.

In some embodiments, the first operating mode includes an autonomous operating mode. In some embodiments, the second operating mode includes a manual operating mode. In some embodiments, the current handwheel actuator angle includes a zero degree angle. In some embodiments, the input indicates an operator engagement of a handwheel of the vehicle. In some embodiments, the input indicates a position of a switch within the vehicle. In some embodiments, the method also includes, in response to a determination that the difference is greater than the threshold, generating a haptic feedback torque based on the first road wheel actuator angle and the current handwheel actuator angle. In some embodiments, the method also includes providing an assist torque to a handwheel of the vehicle based on the first road wheel actuator angle and the haptic feedback torque.

In some embodiments, a method of transitioning an operating mode for a vehicle includes receiving a takeover request from an operator. The method also includes providing haptic feedback to the operator. The method also includes performing a driver readiness assessment. The method also includes transitioning from a first operating mode to a second operating mode using a shared control transition mode.

In some embodiments, the first operating mode corresponds to an autonomous driving mode and the second operating mode corresponds to a manual driving mode. In some embodiments, the shared control transition mode is defined as a road wheel position partially controlled by an autonomous driving system and partially controlled by an operator input. In some embodiments, performing the driver readiness assessment includes: imposing a torque on a handwheel of the vehicle; and evaluating a response, by the operator, to the imposed torque to determine readiness for the manual driving mode.

The present technical solutions may be a system, a method, and/or a computer program product at any possible technical detail level of integration. The computer program product may include a computer readable storage medium (or media) having computer readable program instructions thereon for causing a processor to carry out aspects of the present technical solutions.

Aspects of the present technical solutions are described herein with reference to flowchart illustrations and/or block diagrams of methods, apparatus (systems), and computer program products according to embodiments of the technical solutions. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present technical solutions. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession, in fact, may be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will also be appreciated that any module, unit, component, server, computer, terminal or device exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Such computer storage media may be part of the device, accessible, or connectable thereto. Any application or module herein described may be implemented using computer readable/executable instructions that may be stored or otherwise held by such computer readable media.

While the technical solutions are described in detail in connection with only a limited number of embodiments, it should be readily understood that the technical solutions are not limited to such disclosed embodiments. Rather, the technical solutions can be modified to incorporate any number of variations, alterations, substitutions, or equivalent arrangements not heretofore described, but which are commensurate with the spirit and scope of the technical solutions. Additionally, while various embodiments of the technical solutions have been described, it is to be understood that aspects of the technical solutions may include only some of the described embodiments. Accordingly, the technical solutions are not to be seen as limited by the foregoing description.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

The word "example" is used herein to mean serving as an example, instance, or illustration. Any aspect or design described herein as "example" is not necessarily to be construed as preferred or advantageous over other aspects or designs. Rather, use of the word "example" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

Implementations the systems, algorithms, methods, instructions, etc., described herein can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination. The terms "signal" and "data" are used interchangeably.

As used herein, the term module can include a packaged functional hardware unit designed for use with other components, a set of instructions executable by a controller (e.g., a processor executing software or firmware), processing circuitry configured to perform a particular function, and a self-contained hardware or software component that interfaces with a larger system. For example, a module can include an application specific integrated circuit (ASIC), a Field Programmable Gate Array (FPGA), a circuit, digital logic circuit, an analog circuit, a combination of discrete circuits, gates, and other types of hardware or combination thereof. In other embodiments, a module can include memory that stores instructions executable by a controller to implement a feature of the module.

Further, in one aspect, for example, systems described herein can be implemented using a general-purpose computer or general-purpose processor with a computer program that, when executed, carries out any of the respective methods, algorithms, and/or instructions described herein. In addition, or alternatively, for example, a special purpose computer/processor can be utilized which can contain other hardware for carrying out any of the methods, algorithms, or instructions described herein.

Further, all or a portion of implementations of the present disclosure can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described embodiments, implementations, and aspects have been described in order to allow easy understanding of the present invention and do not limit the present invention. On the contrary, the invention is intended to cover various modifications and equivalent arrangements included within the scope of the appended claims, which scope is to be accorded the broadest interpretation to encompass all such modifications and equivalent structure as is permitted under the law.

What is claimed is:

1. A system for providing operating mode transition for a vehicle, the system comprising:
    a processor; and
    a memory including instructions that, when executed by the processor, cause the processor to:
        receive an input indicating a request to transition from a first operating mode of the vehicle to a second operating mode of the vehicle;
        determine a first planned trajectory corresponding to the first operating mode;
        determine a second planned trajectory corresponding to the second operating mode;
        determine a first road wheel actuator angle corresponding to the first planned trajectory;
        determine a second road wheel actuator angle corresponding to the second planned trajectory;
        determine a difference between a current handwheel actuator angle and a handwheel actuator angle corresponding to the second road wheel actuator angle;
        in response to a determination that the difference is less than a threshold, transition from the first operating mode to the second operating mode over a determined period;
        in response to a determination that the difference is greater than the threshold, generate a haptic feedback torque based on the first road wheel actuator angle and the current handwheel actuator angle; and
        apply a scaling factor to the haptic feedback torque, wherein the scaling factor is dynamically generated based on, at least, a handwheel velocity.

2. The system of claim 1, wherein the first operating mode includes an autonomous operating mode.

3. The system of claim 1, wherein the second operating mode includes a manual operating mode.

4. The system of claim 1, wherein the current handwheel actuator angle includes a zero degree angle.

5. The system of claim 1, wherein the input indicates an operator engagement of a handwheel of the vehicle.

6. The system of claim 1, wherein the input indicates a position of a switch within the vehicle.

7. The system of claim 1, wherein the instructions further cause the processor to provide an assist torque to a handwheel of the vehicle based on the first road wheel actuator angle and the haptic feedback torque.

8. A method for providing operating mode transition for a vehicle, the method comprising:
    receiving an input indicating a request to transition from a first operating mode of the vehicle to a second operating mode of the vehicle;
    determining a first planned trajectory corresponding to the first operating mode;
    determining a second planned trajectory corresponding to the second operating mode;
    determining a first road wheel actuator angle corresponding to the first planned trajectory;
    determining a second road wheel actuator angle corresponding to the second planned trajectory;
    determining a difference between a current handwheel actuator angle and a handwheel actuator angle corresponding to the second road wheel actuator angle; and
    in response to a determination that the difference is less than a threshold, transitioning from the first operating mode to the second operating mode over a determined period;
    in response to a determination that the difference is greater than the threshold, generating a haptic feedback torque based on the first road wheel actuator angle and the current handwheel actuator angle; and
    applying a scaling factor to the haptic feedback torque, wherein the scaling factor is dynamically generated based on, at least, a handwheel velocity.

9. The method of claim 8, wherein the first operating mode includes an autonomous operating mode.

10. The method of claim 8, wherein the second operating mode includes a manual operating mode.

11. The method of claim 8, wherein the current handwheel actuator angle includes a zero degree angle.

12. The method of claim 8, wherein the input indicates an operator engagement of a handwheel of the vehicle.

13. The method of claim 8, wherein the input indicates a position of a switch within the vehicle.

14. The method of claim 8, further comprising providing an assist torque to a handwheel of the vehicle based on the first road wheel actuator angle and the haptic feedback torque.

15. A method of transitioning an operating mode for a vehicle, the method comprising:
    receiving a takeover request from an operator;
    generating a haptic feedback based on a first road wheel actuator angle and a current handwheel actuator angle; and
    applying a scaling factor to the haptic feedback, wherein the scaling factor is dynamically generated based on, at least, a handwheel velocity;
    providing the haptic feedback to the operator;
    performing a driver readiness assessment; and
    transitioning from a first operating mode to a second operating mode using a shared control transition mode.

16. The method of claim 15, wherein the first operating mode corresponds to an autonomous driving mode and the second operating mode corresponds to a manual driving mode.

17. The method of claim 15, wherein the shared control transition mode is defined as a road wheel position partially controlled by an autonomous driving system and partially controlled by an operator input.

18. The method of claim 15, wherein performing the driver readiness assessment includes:
    imposing a torque on a handwheel of the vehicle; and
    evaluating a response, by the operator, to the imposed torque to determine readiness for the manual driving mode.

* * * * *